US007734526B2

(12) United States Patent  (10) Patent No.: US 7,734,526 B2
Howard et al.  (45) Date of Patent: Jun. 8, 2010

(54) INVESTMENT CLASSIFICATION AND TRACKING SYSTEM

(75) Inventors: C. Thomas Howard, Littleton, CO (US); Andrew Howard, Denver, CO (US); Craig Callahan, Greenwood Village, CO (US)

(73) Assignee: Athenainvest, Inc., Denver, CO (US)

( * ) Notice: Subject to any disclaimer, the term of this patent is extended or adjusted under 35 U.S.C. 154(b) by 0 days.

(21) Appl. No.: 11/854,978

(22) Filed: Sep. 13, 2007

(65) Prior Publication Data

US 2008/0071702 A1  Mar. 20, 2008

Related U.S. Application Data

(60) Provisional application No. 60/941,834, filed on Jun. 4, 2007, provisional application No. 60/917,001, filed on May 9, 2007, provisional application No. 60/915,266, filed on May 1, 2007, provisional application No. 60/914,218, filed on Apr. 26, 2007, provisional application No. 60/893,068, filed on Mar. 5, 2007, provisional application No. 60/825,634, filed on Sep. 14, 2006.

(51) Int. Cl.
 *G06Q 40/00* (2006.01)
(52) U.S. Cl. .................................... 705/36 R
(58) Field of Classification Search ............. 705/36 R
 See application file for complete search history.

(56) References Cited

U.S. PATENT DOCUMENTS

| | | | |
|---|---|---|---|
| 5,371,807 A * | 12/1994 | Register et al. ............. 382/159 |
| 5,806,048 A * | 9/1998 | Kiron et al. ................ 705/36 R |
| 5,812,987 A | 9/1998 | Luskin et al. | |
| 5,941,945 A | 8/1999 | Aditham et al. | |
| 6,055,517 A | 4/2000 | Friend et al. | |
| 6,282,520 B1 | 8/2001 | Schirripa | |
| 6,370,516 B1 | 4/2002 | Reese | |
| 6,484,151 B1 | 11/2002 | O'Shaughnessy | |
| 6,968,317 B1 | 11/2005 | Wallace et al. | |
| 2006/0080227 A1 | 4/2006 | Boglaev | |

OTHER PUBLICATIONS

"Types of funds/fund objectives". Oct. 6, 2004. USA Today's Stock Mutual Fund Report.*
"Schwab Introduces New Online Mutual Fund Selection and Screener Tools". Dec. 22, 1999. PR Newswire.*
Albertson, Joshua. "Large-Cap Growth Is Back". Nov. 18, 2005. SmartMoney.com.*
Hedge Fund Research, Inc., HFR Strategy Definitions, Oct. 11, 2003, <http://www.hedgefundresearch.com/pdf/HFR_Strategy_Definitions.pdf> accessed via Internet Archive Wayback Machine <http://www.archive.org>.*
Brown, Stephen J. and Goetzmann, William N., "Mutual fund styles", Journal of Financial Economics 43 (1997) 373-399.*

(Continued)

*Primary Examiner*—James A Kramer
*Assistant Examiner*—Eric T Wong
(74) *Attorney, Agent, or Firm*—Sheridan Ross P.C.

(57) ABSTRACT

The present invention is directed to an asset classification system based on investment strategy. The investment strategies include capitalization strategy, competitive position strategy, economic conditions strategy, future growth investment strategy, market condition strategy, opportunity strategy, profitability strategy, risk strategy, social considerations strategy, and valuation strategy.

62 Claims, 21 Drawing Sheets

OTHER PUBLICATIONS

Howard et al., "The Problematic "Style" Grid", Journal of Investment Consulting, vol. 8, No. 1, Winter 2005-06, pp. 44-56.
Wermers "A Matter of Style: The Causes and Consequences of Style Drift in Institutional Portfolios", Jul. 2002, 30 pages.
Teo et al., "Style effects in the cross-section of stock returns", Journal of Financial Economics 74 (2004) 367-398.
Kacperczyk et al., "On the Industry Concentration of Actively Managed Equity Mutual Funds", date unknown, 50 pages.
Cremers et al., "How Active Is Your Fund Manager? A New Measure That Predicts Performance", available at http://ssrn.com.abstract=891719. Jan. 15, 2007, 57 pages.
Callahan et al., "Outside the Box", Investment Advisor, Sep. 2005, pp. 84-88.
Rekenthaler "In Defense of Style Boxes", Investment Advisor, Jun. 2006, 6 pages.
Howard "Study Conducted by Tom Howard using Apr. 2007 SBI and Zephyr Databases", published Sep. 2007, 33 pages.
"Boxes are not Classes" by Howard and Callahan, Investment Advisor Magazine, Jan. 2006, p. 1-5.
"Risky Business" by Callahan and Howard, Investment Advisor Magazine, Feb. 2006, p. 1-8.
International Search Report for International (PCT) Patent Application No. PCT/US07/78556, mailed Sep. 24, 2008.
Written Opinion for International (PCT) Patent Application No. PCT/US07/78556, mailed September 24, 2008.
International Search Report for International (PCT) Patent Application No. PCT/US07/78556, mailed Oct. 6, 2008.
Written Opinion for International (PCT) Patent Application No. PCT/US07/78556, mailed Oct. 6, 2008.

* cited by examiner

Trading Report

Portfolio Information
Wes Schrader
Wes Schrader

| NASDAQ | Fund Name | Current | What If | IRA Change |
|---|---|---|---|---|
| UNEAQX | Blended Equity Fund | 104,000 | 0 | -104,000 |
| FCECX | Fidelity Advisor Consumer Discretionary Fund | 0 | 200,000 | 200,000 |
| FCNAX | Fidelity Advisor Consumer Discretionary Fund | 208,000 | 200,000 | -8,000 |
| FCLBX | Fidelity Advisor Industrials Fund | 0 | 200,000 | 200,000 |
| GABCX | Gabelli ABC Fund | 72,000 | 0 | -72,000 |
| TENAX | Large Cap Core Equity Fund | 104,000 | 200,000 | 96,000 |
| LKEOX | LKCM Equity Fund | 80,000 | 0 | -80,000 |
| PVEAX | Phoenix Value Equity Fund | 72,000 | 0 | -72,000 |
| VALSX | Value Line Premier Growth Fund Inc | 160,000 | 0 | -160,000 |
| | Fund Total | 800,000 | 800,000 | 0 |

FIG.12

| Primary Strategy | Secondary Strategy | | | | | | | | | |
|---|---|---|---|---|---|---|---|---|---|---|
| | Quant | Risk | Opportunity | Valuation | Economic Conditions | Market Conditions | Competitive Position | Profitability | Social Consideration | Future Growth |
| Valuation | 24 | 14 | 33 | | 40 | 50 | 211 | 24 | 3 | 87 |
| Market Conditions | 5 | 2 | 1 | 9 | 5 | | 11 | 2 | 2 | 6 |
| Quantative | | 7 | | 6 | 10 | 4 | 12 | 1 | 1 | 4 |
| Risk | 3 | | 3 | 8 | 2 | 2 | 5 | | | 3 |
| Social Considerations | 1 | 1 | | 10 | 2 | 5 | 9 | | | 7 |
| Complete Position | 12 | 11 | 12 | 131 | 128 | 28 | | 37 | 3 | 172 |
| Economic Conditions | 5 | 7 | | 7 | | 15 | 33 | 3 | 5 | 20 |
| Profitability | 1 | 1 | 3 | 7 | 7 | 3 | 8 | | 1 | 6 |
| Opportunity | 7 | 5 | | 12 | 5 | 1 | 4 | 2 | | 3 |
| Future Growth | 12 | 9 | 6 | 71 | 28 | 24 | 143 | 17 | 3 | |

FIG. 20

| Fund Return | 14.25% |
|---|---|
| Universe return | -10.25% |
| Validation Index alpha | -1.23% |
| Fund alpha | 2.77% |
| Element 1 return | -0.35% |
| Element 2 return | -0.76% |
| ... | ... |
| Unexplained alpha | 1.13% |

FIG. 21

INVESTMENT CLASSIFICATION AND TRACKING SYSTEM

CROSS REFERENCE TO RELATED APPLICATION

The present application claims the benefits of U.S. Provisional Application Ser. Nos. 60/825,634, filed Sep. 14, 2006; 60/893,068, filed Mar. 5, 2007; 60/914,218, filed Apr. 26, 2007, each of the foregoing applications being entitled "Investment Strategy; and 60/915,266, filed May 1, 2007; 60/917,001, filed May 9, 2007, and 60/941,834, filed Jun. 4, 2007, each of which is incorporated herein by this reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

FIELD OF THE INVENTION

The invention relates generally to investment management classification and tracking systems and particularly to equity investment management classification and tracking systems.

BACKGROUND OF THE INVENTION

Equity management classification systems are well established in the investment community. In 1988, William Sharpe presented the concept of Returns Based Style Analysis (RBSA) and, in 1992, Morningstar introduced the nine box size/value-growth characteristic grid. This grid described equity funds using the following labels: growth, value, blend, small-capitalization, large-capitalization, and mid-capitalization. Others soon followed with their own variation of the grid, designed to provide an alternative classification to aggressive growth, growth, and growth-and-income mutual fund classifications. Today, the industry uses the grid and the RBSA to categorize and select equity managers and as a result, investment performance began to suffer.

The asset management industry's over-reliance on the size/value-growth characteristic grid and Sharpe's RBSA is detrimental and misleading to investors, advisors, consultants, and planners alike and constrains asset managers. The widespread acceptance and entrenchment of this system lowers investor returns. Constraining asset managers from pursuing a specific investment strategy causes a myriad of problems.

Constraining equity managers hurts performance. Constraining equity managers to any of the nine characteristic boxes handicaps performance by an estimated average 300 basis points annually for US equities. When managers are boxed in, the available universe of equities reduces to a fraction, and the resulting subset of equities from which a manager may choose results in suboptimal equity selection. Rather than adding top-ranked stocks to a portfolio, a constrained manager is forced to pick stocks much further down the list of optimal choices.

Constraining equity managers forces managers to strategy drift. By reducing the available universe of equities to a fraction, a manager pursuing any particular equity strategy is inhibited from choosing their best stocks. Investment Strategy is the way a manager goes about analyzing, buying and selling investment assets and liabilities. When a manager is not allowed to pick the best stocks, that manager is forced to strategy drift. Thus, a manager must choose between being box consistent or being strategy consistent. They cannot be both box and strategy consistent. Our research shows that it is better to be strategy consistent rather than box consistent.

The foregoing problems arise from the fact that characteristic boxes are not asset classes. Although treated as such, characteristic boxes do not provide the diversification and risk reduction benefits which define asset classes. Asset classes should be compositionally unique, have low correlations, and have a consistent classification over the long-term. Boxes are not asset classes. Instead, the universe of US equities is just one asset class, not nine, and classification guided by the nine box grid does not provide the diversification or risk reduction benefits which should be expected by dissimilar asset classes.

Characteristic boxes give no insight into how a manager makes decisions. Using the grid to categorize managers only gives investors information about the characteristics of the resulting portfolio. It does nothing to help the investor understand equity strategy; that is, it does nothing to help investors understand how the manager goes about analyzing, buying and selling stocks, what we call equity strategy.

Contrary to common perceptions, boxes wipe out alpha and provide no incremental risk reduction benefits. A random selection of mutual funds performs as well as knowing the mutual fund's box. Even selecting all funds from the same box can have acceptable risk features. Simply put, a consistent strategy, without regard to the box, performs best.

There is a need for a system to categorize and evaluate managers based on their investment strategies.

SUMMARY OF THE INVENTION

The following presents a simplified summary of the invention to provide an understanding of some aspects of the invention. This summary is not an extensive overview of the invention and its various embodiments. It is intended neither to identify key or critical elements of the invention nor to delineate the scope of the invention but to present selected concepts of the invention in a simplified form as an introduction to the more detailed description presented below.

These and other needs are addressed by the various embodiments and configurations of the present invention. The present invention is directed generally to a system of asset manager categorization and portfolio selection based on investment strategies.

In a first invention, a method and system are provided that includes the steps/operations of:

(a) receiving, from a user, a selected return and risk;

(b) based on the selected return and risk, determining automatically a risk-return efficient frontier;

(c) based on the selected level of risk, determining automatically a tangency portfolio, the tangency portfolio having allocation weightings among members of a set of asset classes and/or set of investment strategies;

(d) determining automatically differences between the tangency portfolio and a user selected portfolio; and (e) providing the differences to the user.

In a second invention, a method and system are provided that include the steps/operations of:

(a) providing to a user a plurality of investment strategies, each investment strategy comprising a set of managed securities; and (b) for each security in the sets of managed security, providing the user with a consistency measure indicating a degree to which the respective manager adheres to the corresponding investment strategy.

In a third invention, a method and system are provided that include the steps/operations of:

(a) providing a user with a plurality of investment strategies, each investment strategy comprising a set of managed securities;

(b) receiving, from the user, at least one selected investment strategy; and (c) determining, for the at least one selected investment strategy, at least one dissimilar investment strategy; and (d) providing at least one dissimilar investment strategy to the user.

In a fourth invention, a method and system are provided that include the steps/operations of:

(a) determining for a plurality of security managers a plurality of sets of security descriptions, each manager having a corresponding set of security descriptions and each security description describing a security managed by the respective manager; and (b) based on the security descriptions, categorizing the securities by investment strategy.

In a fifth invention, a method and system are provided that include the steps/operations of:

(a) determining, for each of a number of managed securities and/or security managers, one or more investment strategies employed by the managed security and/or security manager in buying and selling securities;

(b) categorizing each of the managed securities and/or security managers based on the set of investment strategies employed by the manager;

(c) receiving a request from a user for managed securities and/or security managers adhering to a selected set of investment strategies; and (d) providing to the user a subset of the managed securities and/or security managers adhering primarily to the set of investment strategies.

Using selected return and risk measures and the efficient frontier and tangency portfolio, users can effectively and efficiently configure a planned portfolio having a likelihood of meeting selected risk and return objectives.

The tangency portfolio and user selected portfolio are typically allocated among a set of investment strategies. The investment strategies, in one application, include competitive position strategy, economic conditions strategy, future growth investment strategy, market condition strategy, opportunity strategy, profitability strategy, quantitative strategy, risk strategy, social considerations strategy, and valuation strategy. As will be appreciated, other strategies are possible for differing kinds of securities and assets. In that event, a security or asset-type identifier can be used in search queries to confirm that the correct set of investment strategies is employed. These investment strategies are commonly selected based on historical equity manager behavior and/or manager input. The strategies are believed to be compositionally unique, have lower correlations, have consistent classification over the long-term, and provide insight into how equity managers make investment decisions. Accordingly, the strategies do not constrain managers and can provide enhanced equity performance and inhibit strategy drift. An equity manager can have both primary and secondary investment strategies.

In one configuration, the algorithm for determining the efficient frontier and the tangency portfolio is:

determining, based on the selected return and risk, corner asset portfolios;

determining, for selected points along the efficient frontier, allocation weightings among members of the set of asset classes and/or set of investment strategies and expected return and risk;

identifying the point along the efficient frontier corresponding to the tangency portfolio; and determining, for the tangency portfolio, allocation weightings among members of the set of asset classes and/or set of investment strategies, expected return, and risk.

A diversification measure can be determined for the selected asset portfolio and provided to the user.

For each investment strategy, a set of security managers can be found for selection by the user. Each manager has a corresponding consistency measure, which indicates a degree of consistency of the security manager in adhering to the associated primary and/or secondary investment strategies.

When the user changes asset allocation weightings for one or more investment strategies in the selected portfolio, the changes propagated automatically among the various investment strategies, differences between the altered portfolio and the tangency portfolio determined, and the output provided to the user.

To enrich the user interface, the relative positions of the efficient frontier, tangency portfolio, selected (current or existing) portfolio, and altered portfolio can be illustrated graphically for the user.

To enhance risk diversification, one or more investment strategies dissimilar to a selected strategy can be identified and provided to the user. By identifying dissimilar strategies for asset weightings in a portfolio, the strategies can provide diversification and risk reduction benefits.

Each asset manager can determine the pertinent investment strategies for his or her security. This can ensure that securities are properly categorized, encourage managers to have higher levels of strategy consistency, and discourage users from having to choose between box consistency and strategy consistency.

It will also be possible to classify individual investments, such as individual stocks, by the strategies of the managers that hold them and not the other way around.

The present invention can provide a number of advantages depending on the particular configuration. For example, a strategy-based system can allow managers to be categorized and evaluated without affecting performance. Managers are preferably categorized by strategy rather than by boxes.

These and other advantages will be apparent from the disclosure of the invention(s) contained herein.

Selected words and phrases used herein are defined below.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Competitive position investment strategy is a strategy in which the manager focuses on business principles, including quality of management, market power, product reputation, and competitive advantage. Important considerations include the sustainability of the business model and a history of adapting to market changes. Strategy elements of this strategy include strength of fundamentals, defensibility of market position, management quality, and strength of innovation.

"Determine", "calculate" and "compute," and variations thereof, are used interchangeably and include any type of methodology, process, mathematical operation or technique.

Economic conditions investment strategy is a strategy in which the manager follows a top down approach based on economic fundamentals. These fundamentals can include employment, productivity, inflation, and industrial output. The manager gauges the overall health of the economy, trying to ascertain where it is in the business cycle, the resulting supply and demand situation in various industries, and ultimately the best stocks to purchase. Strategy elements of this strategy include Gross Domestic Product, interest rates, and monetary policy.

Efficient frontier is a concept of Modern Portfolio Theory (MPT). MPT proposes how rational investors will use diversification to optimize their portfolios, and how a risky asset should be priced. The basic concepts of the theory are Markowitz diversification, the efficient frontier, capital asset pricing model, the alpha and beta coefficients, the Capital Market Line and the Securities Market Line. MPT generally models an asset's return as a random variable, and models a portfolio as a weighted combination of assets; the return of a portfolio is thus the weighted combination of the assets' returns. Moreover, a portfolio's return is a random variable, and consequently has an expected value and a variance. Risk, in this model, is the standard deviation of the portfolio's return. Every possible asset combination can be plotted in risk-return space, and the collection of all such possible portfolios defines a region in this space. The line along the upper edge of this region is known as the efficient frontier (sometimes "the Markowitz frontier"). Combinations along this line represent portfolios for which there is lowest risk for a given level of return. Conversely, for a given amount of risk, the portfolio lying on the efficient frontier represents the combination offering the best possible return. Mathematically the efficient frontier is the intersection of the set of portfolios with minimum variance and the set of portfolios with maximum return. The efficient frontier is illustrated in FIG. 1, with return $\mu_p$ on the y axis, and risk $\sigma_p$ on the x axis. The efficient frontier is normally convex because the risk-return characteristics of a portfolio change in a non-linear fashion as its component weightings are changed. As will be appreciated, portfolio risk is a function of the correlation of the component assets and changes in a non-linear fashion as the weighting of component assets changes. The efficient frontier is a parabola (hyperbola) (only with short sales allowed, otherwise is only approximately a parabola), when expected return is plotted against variance (standard deviation). The region above the frontier is unachievable by holding risky assets alone. No portfolios can be constructed corresponding to the points in this region. Points below the frontier are suboptimal. A rational investor will hold a portfolio only on the frontier. Strategy and asset class frontiers are each a type of efficient frontier. They each represent the set of investment strategy-optimized portfolios producing the highest expected return for a given level of risk.

Future growth investment strategy is a strategy in which the manager focuses on companies poised to grow rapidly relative to others. The future growth and valuation strategies are not mutually exclusive, and it is plausible for a manager to deem both important in the investment process. Strategy elements of future growth include, over a selected time period, rate of overall company growth, rate of earnings growth, sustainable growth rate, and accelerated growth rate.

Investment strategy is the manner in which a manager analyzes buys and/or sells investment assets and liabilities. Investment strategy is sometimes also referred to as investment style, investment methodology, or investment technique. Investment strategy can be described in both quantitative and qualitative terms.

Market condition investment strategy is a strategy in which the manager considers the equity's recent price and volume history relative to the market and similar stocks. The manager may consider overall stock market conditions as well. Strategy elements of this strategy include technical analysis, charting, and momentum.

"Module" refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

Opportunity investment strategy is a strategy in which the manager focuses on unique opportunities that may exist for a small number of stocks or at different points in time. This strategy may involve combining stocks and derivatives and may also involve use of considerable leverage. Many hedge fund managers are characterized as following an opportunity strategy, but a mutual fund manager may also be so classified. Strategy elements of this strategy include earnings surprise and price modeling.

Primary strategy refers to the investment strategy primarily, or most frequently or consistently, followed by a manager.

Profitability investment strategy is a strategy in which the manager focuses on company profitability, as measured in a variety of ways, such as gross margin, operating margin, net margin, and return on equity. Strategy elements of this investment strategy include strength of margins, strength of financials, return on equity, and return on invested capital.

Quantitative investment strategy is a strategy in which the manager focuses on mathematical and statistical inefficiencies in the market and individual stock pricing. Typically, this strategy involves mathematical and statistical modeling with little or no regard to company and market fundamentals. Strategy elements of this strategy include stochastic modeling, quantitative methods, and statistical modeling.

Risk investment strategy is a strategy in which the manager focuses on controlling overall risk, with increasing returns a secondary consideration. A wide range of risk measures may be considered including beta, volatility, company financials, industry and sector exposures, country exposures, and economic and market risk factors. Strategy elements of this strategy include business risk, controlling risk, and market risk.

Secondary strategy refers to the investment strategy secondarily, or, as compared to the primary strategy, next most frequently or consistently, followed by a manager.

Security refers to an instrument which (i) is issued in bearer or registration form; (ii) is of a type commonly dealt in upon securities exchanges or markets or commonly recognized in any area in which it is issued or dealt in as a medium for investment; (iii) is either one of a class or series or by its terms is divisible into a class or series of instruments; and (iv) evidences a share, participation or other interest in property or in an enterprise or evidences an obligation of the issuer. Examples of securities include notes, stocks, treasury stocks, bonds, debentures, evidence of indebtedness, certificates of interest or participation in an oil or mineral title or lease, collateral trust certificate, transferable share, voting trust certificate, any other interest or instrument commonly known as a security, any other certificate of interest or participation, and any temporary or interim certificate, receipt or certificate of deposit, for, or any warrant or right to subscribe or purchase any of the foregoing.

Social considerations investment strategy is a strategy in which the manager focuses on social considerations, including the company's ethical, environmental, and business practices as well as an evaluation of the company's business lines in view of the current social and political climate. Strategy elements of this strategy include social responsibility, political issues, and religious issues.

Strategy consistency refers to the degree of consistency of a manager's asset transactions to the manager's stated strategy. In one configuration, strategy consistency of a security or manager is expressed as an objective measure based on quantitative measures, such as the existence of portfolio constraints (e.g., market capitalization of security or manager, sector/industry weightings of security or manager), number of stocks held by security or manager, characteristic drift of security, number of strategy elements selected by security or manager, and strategy fit of security or manager. These are combined into an index that captures the degree of strategy consistency by the security or manager. The components upon which this index is based may change over time. As will be appreciated, strategy consistency can be measured by other techniques, including directly interviewing the manager.

Valuation or value investment strategy is a strategy in which the manager focuses on stocks selling cheaply compared to peer stocks based on accounting ratios and valuation techniques. The valuation and future growth strategies are not mutually exclusive. It is plausible for a manager to deem both an opportunity strategy, but a mutual fund manager may also be so classified. Strategy elements of this strategy include price ratios, contrarian, and cash flow valuation.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 4 is a screenshot according to an embodiment of the present invention;

FIG. 5 is a screenshot according to an embodiment of the present invention;

FIG. 7 is a screenshot according to an embodiment of the present invention;

FIG. 12 is a trading report according to an embodiment of the present invention;

FIG. 20 is a screenshot according to an embodiment of the present invention; and FIG. 21 is a screenshot according to an embodiment of the present invention.

DETAILED DESCRIPTION

The Strategy-Based Investment (SBI) system categorizes investment managers and can also be used to categorize the investments they hold based on the strategy being pursued by the manager. It is based on the self-described investment strategy or strategies of investment management. Complementary investment strategies provide at least a selected degree of risk diversification while uncomplimentary investment strategies provide less than the selected degree of risk diversification. They may also provide increased portfolio returns as well as less volatility as measured by standard deviation.

Figure 1:
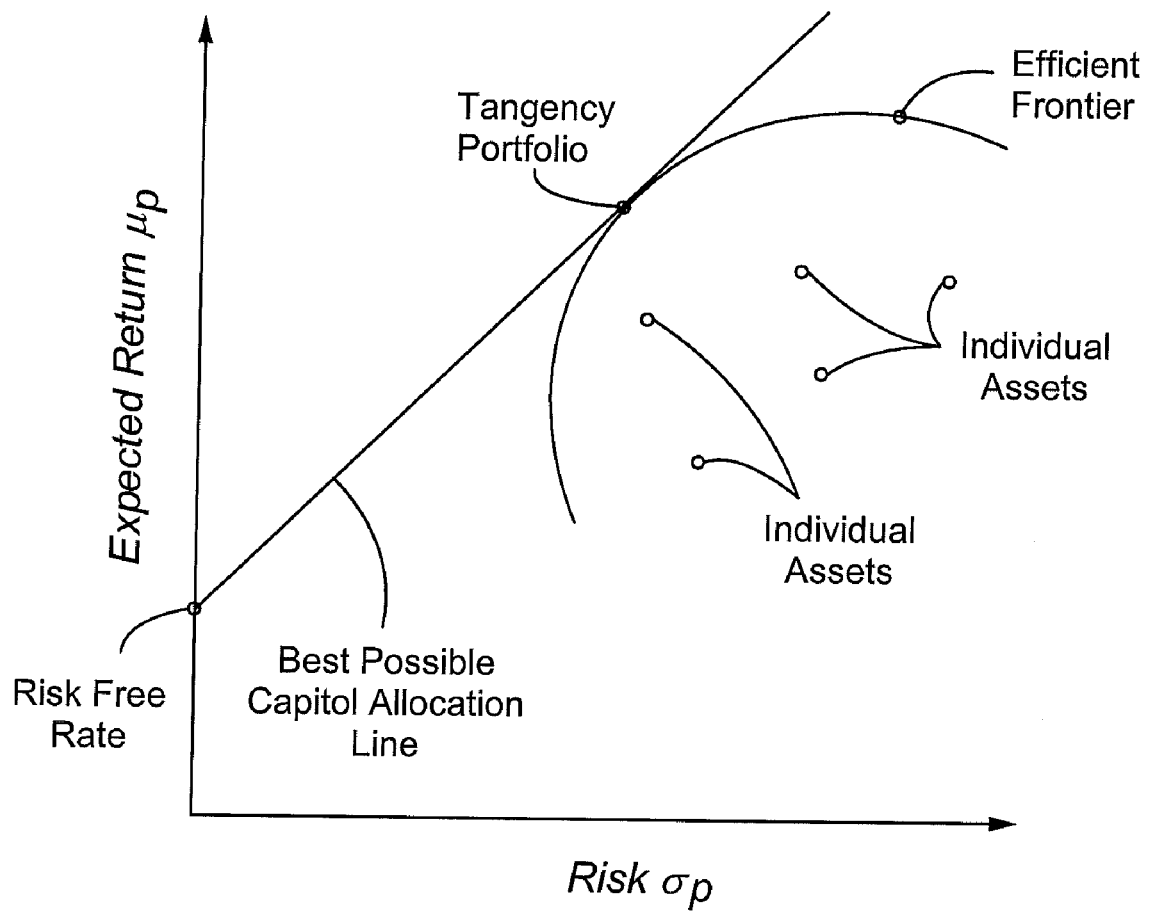
FIG. 1 is a prior art depiction of the relationships among efficient frontier, capital market line, and tangency portfolio.
Figure 2:
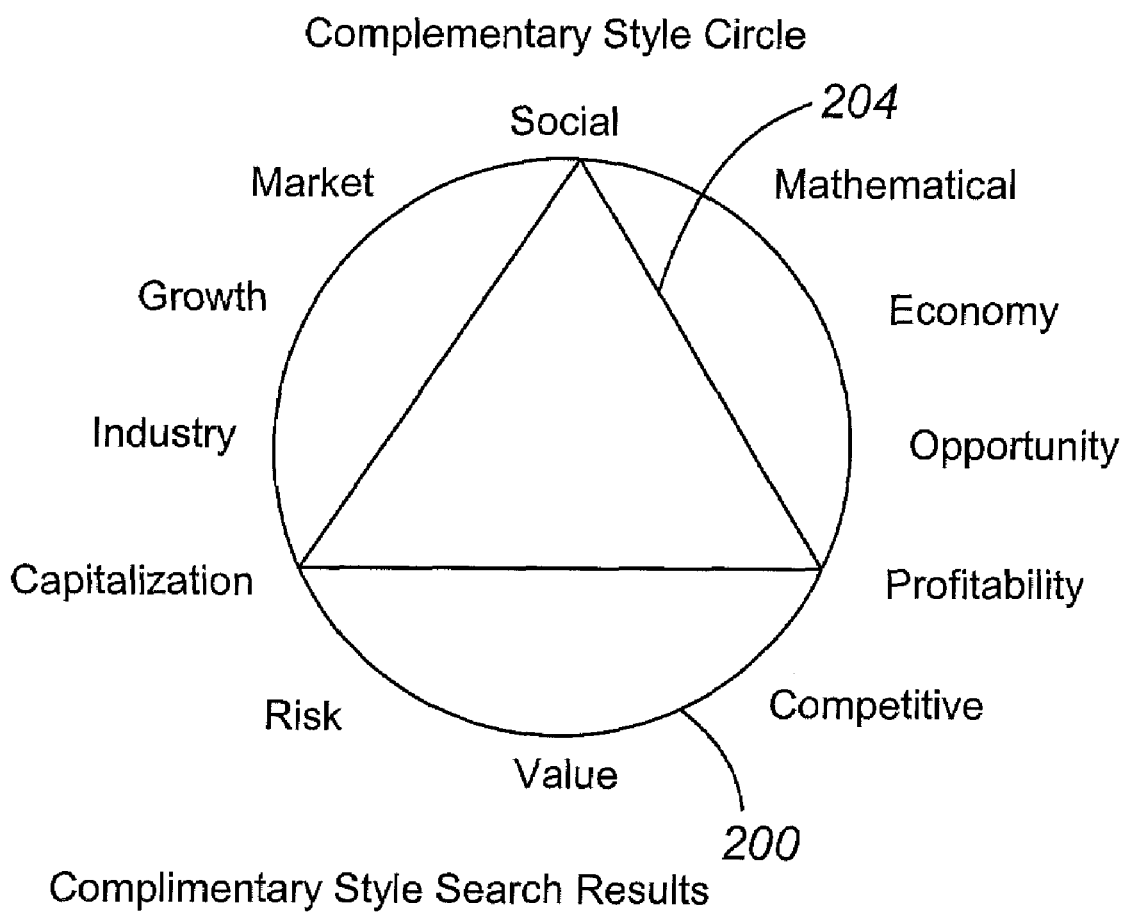
FIG. 2 is a screenshot depicting the complementary style circle according to an embodiment of the present invention.

In one configuration, the SBI system recognizes the following investment strategies: social, mathematical, economy, opportunity, profitability, competitive, value, risk, quantitative, industry, growth, and market. FIG. 2 relationally depicts the various complementary and uncomplimentary investment strategies. The circle 200 is organized such that investment strategies in close proximity are the most similar or uncomplimentary while those further around the circle are most dissimilar or complementary. An optimal portfolio is a combination of the most dissimilar strategies and, thus, the triangle 204, indicating the strategies to be included in a selected portfolio, is diversified.

The SBI system categorizes investment managers and/or securities based on the way they analyze, buy, and sell assets and liabilities regardless of the name used to reference the investment manager's process. As will be appreciated, the SBI system can be applied to any asset or liability class for which managers make investment decisions based on differing investment strategies. Since the SBI system is based on manager input regarding the specific way in which asset management decisions are made, asset classes that can be characterized by the SBI system include, but are not limited to, mutual funds, Separately Managed Accounts or SMA's, separate accounts, hedge funds, company stocks, bonds, real estate, venture capital, commodity funds, private equity, energy funds, precious metals, international stocks, and international bonds. Although the discussion of the SBI system presented below specifically refers to equities, it is to be understood that the SBI system is equally applicable to non-equity asset classes, such as those listed above.

The individual manager investment strategy information, also referred to as a strategy profile, is collected in a database, which forms the basis of the SBI system. The strategy profile is generally comprised of self-selected (or manager selected) primary and secondary investment strategies. Within each strategy there will both quantitative and qualitative strategy elements which further describe the way a manager goes about analyzing, buying, and selling assets. The strategy profile for a given manager may include strategy elements from investment strategies other than the strategy elements of the primary and secondary strategies. The manager is free to select as many or as few strategy elements as is needed to describe the investment process. Within the primary and secondary investment strategies, the manager can rank the relative importance of the strategy elements selected.

Strategy profiles of managers are maintained by the SBI system for use by third parties, such as investment consultants, investment managers, and financial advisors. Portions of the strategy profile are made public while other portions are not. The manager corresponding to a selected strategy profile is expected to adhere to this strategy profile when making investment decisions. The manager is tracked over time to ensure that the stated strategy is being pursued. The strategy profile can allow for a simple as well as a granular categorization of managers. The level of categorization detail will be up to the person using the SBI system.

The strategy profile is used to form managers into SBI peer groups, which are used for performance evaluation. In SBI peer groups, managers are generally grouped by their stated primary and/or secondary investment strategies. Peers having the same primary strategy form the broadest grouping of managers. Within this broad group of strategies, secondary strategies can be used to further segregate managers. The SBI peer group is flexible, allowing advisors and consultants to sort managers based upon primary and secondary strategies along with specific strategy elements of interest.

Performance and consistency measures are based on peer group membership. The SBI performance measure indicates the security's performance relative to the performances of the other members of the security's SBI peer group. The security's publicly reported performance rating and can be based on risk-adjusted returns relative to the other equities within the security's SBI peer group. Beyond this publicly reported performance rating, the user can choose the type of performance measurement, including raw returns, risk adjusted returns, and characteristic adjusted returns. The consistency measure, or SBI strategy consistency rating, is a quantitative indication or rating of the degree to which the selected manager adheres to his or her primary and/or secondary strategy. The SBI performance measure and strategy consistency rating are preferably determined on a 1-5 scale, with a rating of "5" being highest and the rating being reflected by a number of diamonds (or other character) corresponding to the numerical rating, e.g., a rating of three corresponds to three diamonds. The strategy profile is used to create a portfolio of complementary strategy managers. The user will be able to specify the criteria used for identifying complementary strategy managers.

The strategy consistency measure is updated periodically and can be based on both quantitative and qualitative measures. These measures may include the existence of constraints, the number of elements used by the manager, the degree of strategy fit, the correlation with strategy indices, the number of stocks held by the manager, the extent of characteristic drift, the correlation with characteristic indices, the strategy tracking measure, and interviews with the manager The list of measures included my change over time.

The strategy database can be merged with performance and holdings data of third party databases to provide manager selection functionality. The user is able to specify the criteria for the selection process. The method for selecting complementary strategy managers is based on an algorithm involving risk and alpha characteristics and other desired portfolio features.

The SBI system can be made available to users as a web-based platform. It can take the form of a standalone product or as the engine driving a private label system.

Figure 3:
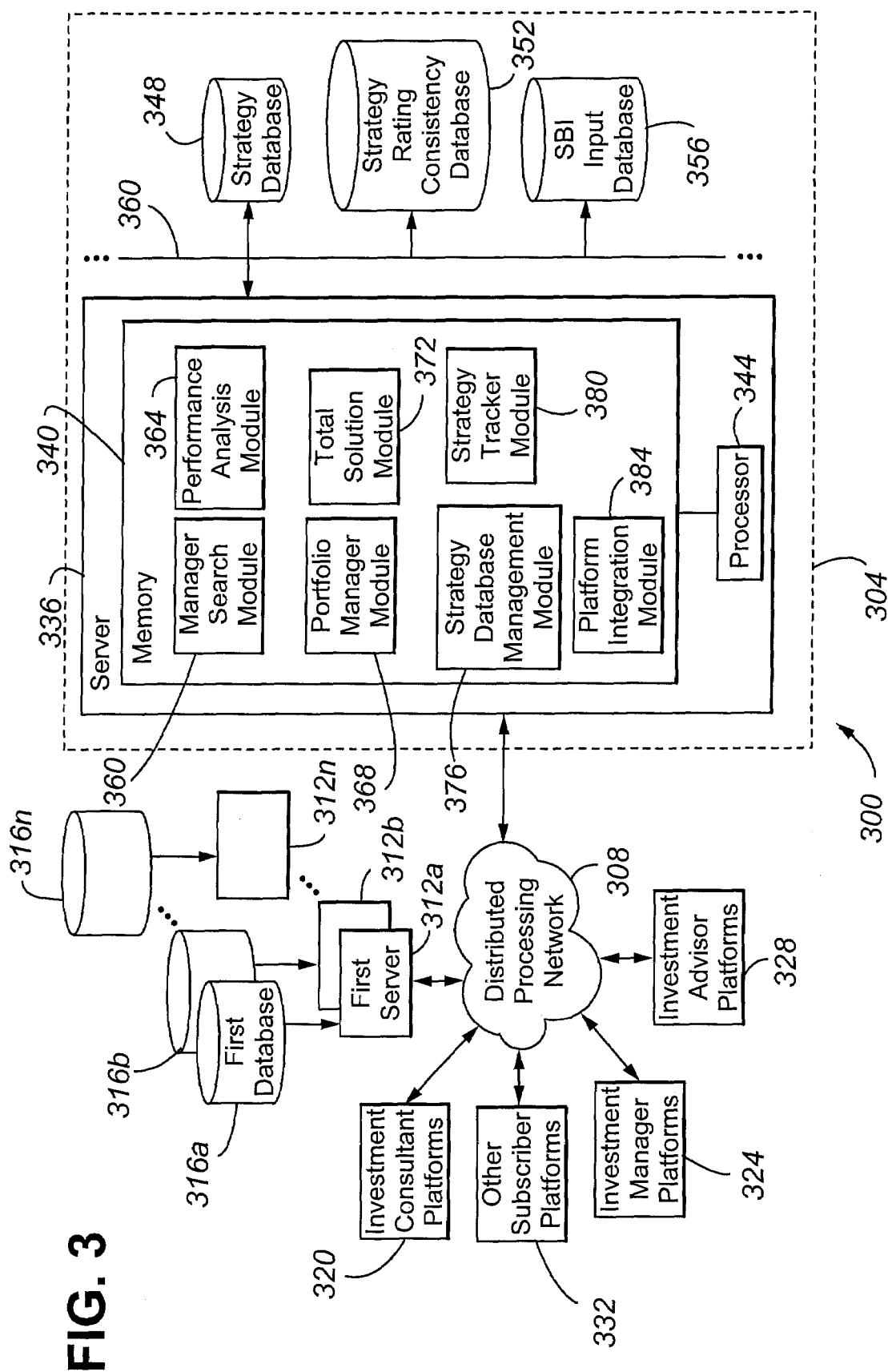
FIG. 3 is a block diagram depicting an architecture according to an embodiment of the present invention.

FIG. 3 is an embodiment of the SBI system.

The SBI system 300 comprises an enterprise network 304 in communication, via a distributed processing network 308 (e.g., a Wide Area Network (WAN) such as the Internet), with a plurality of first, second, . . . nth servers 312*a-n* and associated third party databases 316*a-n* and third party platforms, namely investment consultant platforms 320, investment manager platforms 324, investment advisor platforms 328, and other subscriber platforms 332. The various platforms and servers are preferably configured in a client-server configuration, though a peer-to-peer network configuration may also be used.

The SBI system 300 includes a software-controlled server 336 comprising a memory 340 and processor 344, a strategy database 348, a strategy rating consistency database 352, and an SBI input database 356, all interconnected by a Local Area Network (LAN) 360. The memory 340 includes a number of modules, including a find fund module 360, performance analysis module 364, portfolio manager module 368, total solution module 372, strategy database management module 376, strategy tracker module 380, and platform integration module 384.

The strategy database 348 contains information regarding securities and/or managers. The information includes data descriptors of the primary and secondary strategies of the identified security and/or manager. In one configuration, the data structures for each record include an security (e.g., fund) identifier, an identifier of the primary strategy, an identifier for the secondary strategy, and for each of the identified primary and secondary strategies, one or more component strategy elements for the respective strategy. The component strategy elements may be qualitative or quantitative in nature. The strategy elements can be ranked in the order of their importance to the manager. In one configuration, at least some of this information is received from security managers. An online questionnaire or survey is provided to the managers for completion. The questionnaire or survey provides the managers considerable latitude in describing their specific investment strategies, generally covers investment strategies and strategy elements and immediately informs the manager of the self-described primary and secondary investment strategies. Using just one login, the manager submits separate strategy descriptions for each fund managed.

The strategy rating consistency database 352 contains information regarding securities and/or managers. The information preferably includes a security identifier and, for each security identifier, a consistency rating.

The SBI input database 356 merges investment strategy information in the strategy and strategy rating consistency databases 348 and 352 with third party provided performance and holdings data, such as those in third party databases 316*a-n*. Examples of third party-maintained information include publicly available fund prospectuses, federal and state government regulatory and compliance filings (e.g., filings with the Securities and Exchange Commission), posted web content, historical security transaction records, performance information, holdings information, holdings, manager information, contact information and the like. Each record in the database 356 includes an security identifier, basic security information (e.g., security name, address, and contact information, assets under management, years in existence, investor/investment qualifications, holdings, availability of the fund and the like), manager information (e.g., manager name (s), years managing the fund, total years as an investment manager, and the like), primary strategy identifier, primary strategy elements (the relative importance of which may be ranked relative to one another), secondary strategy identifier, secondary strategy elements (the relative importance of which may be ranked relative to one another), strategy consistency rating, historical performance information, Earnings Per Share, EPS growth, SBI performance measure, growth of a selected investment since inception compared to a selected group of securities such as an index (e.g., Dow Jones index and S&P index), market capitalization, Price-to-Book or P/B ratio, Price per Share or P/S, net asset value, return over a selected period, Price/Earnings or P/E ratio, Standard Deviation or S/D, and portfolio characteristic tiles, such as market capitalization tilt, P/E tilt, EPS growth tilt, and P/B tilt), risk measures (e.g., alpha, beta, standard deviation, Sharpe ratio, alpha, volatility measures, and tilt alpha), (current) expense ratio(s), (current) holding(s), (current) sector weightings, quartile ranking relative to the security's SBI peer group membership, and SBI peer group membership identifier (i.e., identifier of SBI peer group of which the identified security is a member).

As will be appreciated, there may be a separate SBI input database for each asset class and for each type of investment vehicle within an asset class. For example, within securities, there may a separate database for mutual funds, separately managed accounts, and hedge funds.

The fund find module 360 is an online tool that allows subscribers to search for managers and securities within a particular investment strategy and for managers and securities with complementary investment strategies. When searching for a manager or security within a particular investment strategy, the subscriber has the flexibility in the search criteria used, including investment strategy, ratings, investment performance, risk measures, and portfolio characteristics. The underlying algorithm is a simple search that identifies all managers or securities meeting the criteria specified by the subscriber.

Figure 4:
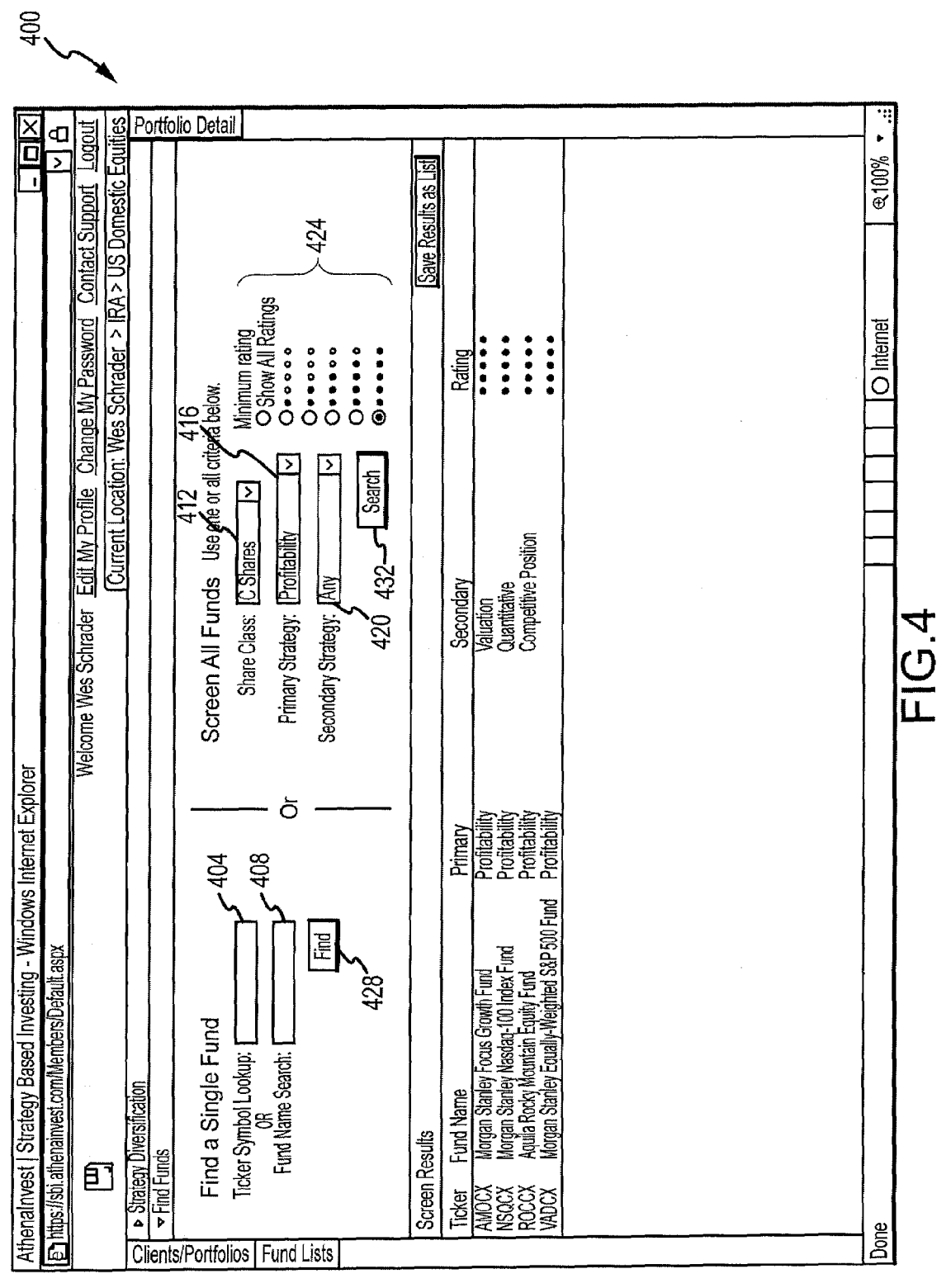
Figure 5:
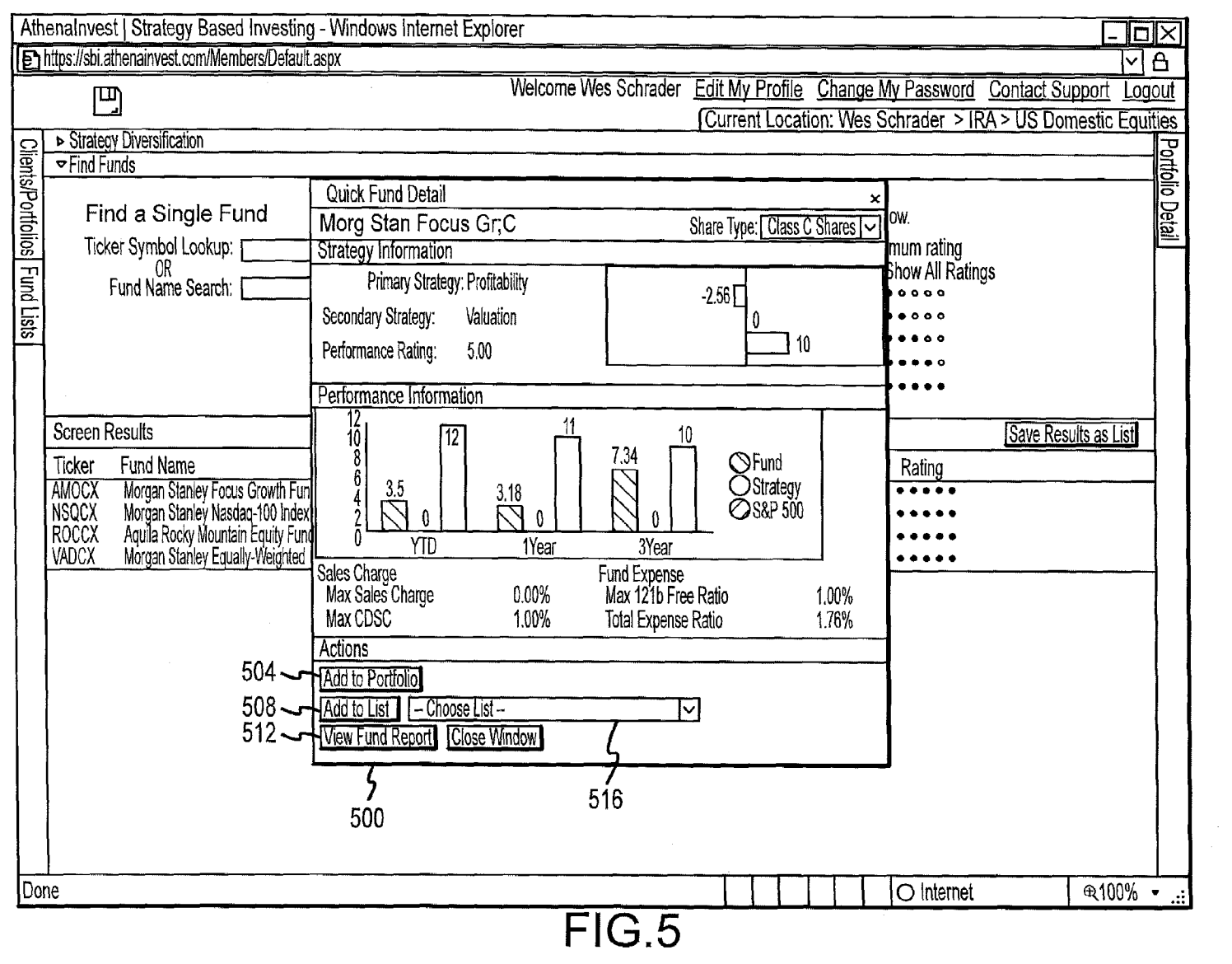

An exemplary fund find interface is depicted in FIGS. 4-5. The display 400 includes a number of fields, including ticker symbol lookup 404, fund name search 408, share class 412 (which has a drop down menu providing as options A class, B class, C class, I class, and R class shares, no class, and other), primary (investment) strategy 416 (which has a drop down menu providing the investment strategies as options), secondary (investment) strategy 420 (which has a drop down menu providing the investment strategies as options), and minimum fund or diamond rating 424. As will be appreciated, other search criteria can be employed including any of the manager and/or security data descriptors noted above. The fields 404 and 408 are associated with a find icon 428, while the remaining fields are associated with a search icon 432. When either icon is selected, a search is performed over the associated fields. In the example shown, a search has been performed over fields 412, 416, 420, and 424, and the results are depicted in the lower half of the display. The search results can be saved as a list by selecting "Save Results as List".

With reference to FIG. 5, the subscriber, by clicking on one of the listed funds (which in this case is Morgan Stanley Focus Growth, class C shares), can cause the manager search module 360 to display the fly-out quick fund detail window 500. The window 500 includes a description of the located security and provides the subscriber with options, including add to portfolio 504, add to list 508, and view fund report 512. To add the security to a list, the subscriber must first select a list to which it is to be added. This is done by completing the field 516. The detail window about a fund can also appear by selecting an icon representing the fund in any user display. For example, selecting any of the listed funds in FIG. 6 will cause a detail window about the selected fund to appear.

In one configuration, once a manager and/or security has been selected, the subscriber can identify the best complementary investment strategy and managers/securities for inclusion in the portfolio. The subscriber can use a number of search criteria, including the desired number of complementary investment strategies and any of the data descriptors noted above such as return, risk and resulting portfolio characteristics. If the number of complementary investment strategies and search criteria is changed, the complementary investment strategy circle is recalculated using the optimization equation.

The performance analysis module 364 is an online tool that provides subscribers with performance data, such as returns, holdings, and characteristic tilts, for managers and securities. The module analyzes performance based on the manager's self-selected SBI peer group. Performance can be measured in terms of a number of portfolio risk characteristics, investment strategies, and strategy elements and can be ranked relative to other managers within the SBI peer group.

The portfolio manager module 368 is an online tool that allows subscribers to track a selected portfolio's performance in terms of returns, holdings, and characteristic tilts. It provides an overall picture of the portfolio as well as in combination with other asset classes held by the selected client investor.

There are several types of selected portfolios. One type of portfolio is the current portfolio of a selected client investor. A second type of portfolio is the target portfolio. The target portfolio corresponds to the tangency portfolio, which is a function of the expected return and risk. A third type of portfolio is the "what if" portfolio, which is a hypothetical or planned portfolio created by the subscriber. Typically, the "what if" portfolio is a modified version of the subscriber's current portfolio.

The total solution module 372 is an online tool that selects automatically managers and securities based on subscriber-defined investment criteria, including the data descriptors noted above, and provides a complete portfolio solution for the investor. The manager module 368 provides a specific set of manager recommendations based on the search criteria specified by the investor. By way of example, the manager module 368 receives inputted parameters from the subscriber and selects, from the set of managers and/or securities satisfying the search criteria, a subset of recommended managers and/or securities for consideration by the subscriber. The recommendations, for instance, can be based on relative values of one or more selected parameters inputted by the subscriber and can be transmitted to the subscriber by the order in which the search results are listed.

The strategy database management module 376 determines, for a selected security or manager, primary and secondary investment strategies and component strategy elements and creates and updates records in the strategy database 348.

The strategy tracker module 380 determines the strategy tracking indices for selected securities and managers and creates and updates records in the strategy rating consistency database 352. The assets being invested in by the security or manager (e.g., stocks when an security fund) are categorized by the type of strategy manager most frequently holding the asset. Over time, the type of assets held by the manager are compared to the assets held by the typical manager within the investment strategy, and a strategy tracking index is created based on this comparison. Following this index will allow for tracking fund strategy consistency over time.

The platform integration module 384 consolidates selected information in the first, second, . . . nth databases 316*a-n* with information in the strategy and rating consistency databases 348 and 352 to create and update composite records in the SBI input database 356 and provides subscriber access to the SBI input database 356 and controls operation of the other logic modules 360, 364, 368, 372, 376, and 380. The integration module 384 provides a seamless link between the enterprise network 304 and the third party platforms 320, 324, 328, and 332.

The collective operation of the various modules will now be discussed with reference to FIGS. 6-14.

Figure 6:
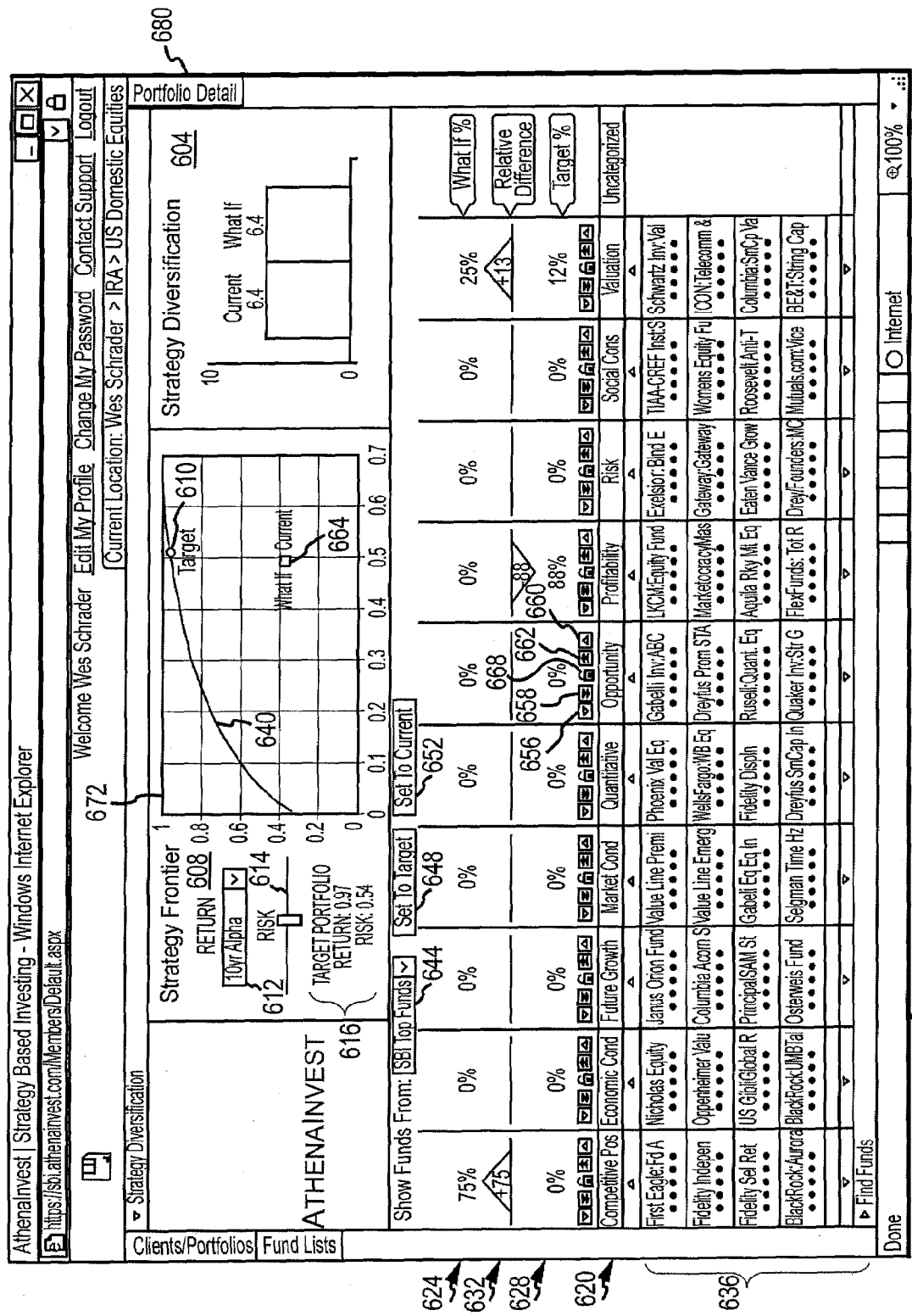
FIG. 6 is a screenshot according to an embodiment of the present invention.

FIG. 6 is a master or top level screen display 600 for the SBI system. The display 600 provides a variety of information to the subscriber, This information includes strategy diversification 604, which, on a scale of 10 (with 10 being the highest level of diversification), shows the diversification ratings of the current and "what if" portfolios (both of which have a common rating of 6.4); the strategy frontier 608, which shows the target or tangency profile 610 for the selected return and risk, the selected return 612, current risk (slider) setting 614, the target portfolio return and risk settings 616, each investment strategy 620, and, for each investment strategy, the weighting in the "what if" and target portfolios 624 and 628, respectively, the relative difference 632 between the weightings, and listings 636 of the selected securities for each investment strategy.

The strategy frontier (i.e. efficient frontier) curve 640 is a function of the (relative) relative return selected in box 612 and (relative) risk setting 614. The relative return on the vertical or Y-axis of the frontier curve 640 captures the lowest (0) to highest (1) expected returns possible when forming strategy-based portfolios. The relative return is based on the particular return estimates chosen and the strategy quadratic optimization algorithm. Relative risk on the horizontal or X-axis of the frontier curve 640 captures the range of lowest (0) to highest (1) portfolio deviations when forming strategy-based portfolios. The relative risk is based on the historical strategy standard deviations and correlations. Thus, changes in the relative return and risk settings will typically change the shape and/or position of the strategy frontier curve 640, position of the target portfolio 610, and the weightings of the target portfolio. The strategy diversification values indicate that the current and "what if" portfolios are not well diversified. A diversification value of 9 or higher is considered to be well diversified. Strategy diversification is determined using the concept of complementary investment strategies discussed with reference to FIG. 2.

Figure 13:
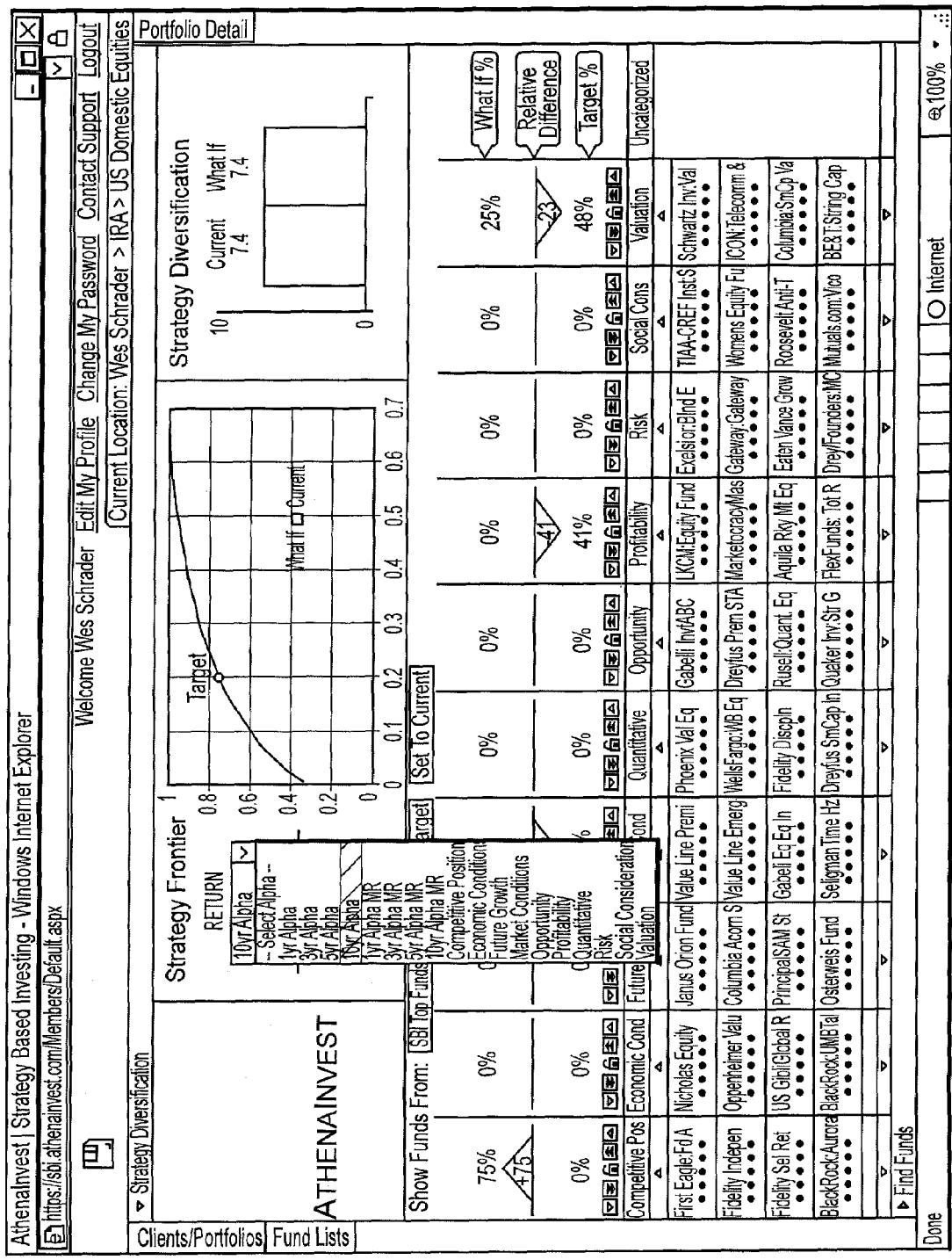
FIG. 13 is a screenshot according to an embodiment of the present invention.

FIG. 13 is a screen shot 1300 showing the various options available to the subscriber as the relative return. The options are 1-year alpha, 3-year alpha, 5-year alpha, 10-year alpha, 1-year alpha MR, 3-year alpha MR, 5-year alpha MR, 10-year alpha MR, competitive position, economic considerations, future growth, market conditions, opportunity, profitability, quantitative, risk, social considerations, and valuation. The first group of options, namely 1-year alpha, 3-year alpha, 5-year alpha, 10-year alpha, contains historical returns based on the average performance of funds within each category. In the case of US equity open end funds, the returns are obtained from Lipper and are net of fund management fees and 12B-1 expenses, but are not net of any load, sales, wrap, or additional outside management fees. In the case of equity funds, 1, 3, 5, and 10 year estimates are provided. The next group, namely 1, 3, 5, and 10 year Mean Reversion (MR) estimates, are based on the historical returns, with the highest and lowest returns swapped, the next highest and lowest swapped, and so forth. In other words, the MR return estimates are obtained by assuming that the best performing strategy over a time period will become the worst performing over the next time period by the same amount of the previously worst performing. The final group of options are investment strategies and mirror the investment strategies associated with each column listed in the lower portion of display 600. The selection of an anchor investment strategy forces the chosen strategy into the target portfolio and adds other strategies based on risk reduction considerations only. For example, if competitive position is selected, then every target portfolio will contain competitive position (with the possible exception of the zero relative risk portfolio) along with those strategies that best complement competitive position with respect to risk reduction. As the risk slider is increased, the competitive position allocation approaches and ultimately reaches 100%. The selected return estimates become the basis for all strategy frontier, diversification, and allocation calculations.

Returning to FIG. 6, the display 600 further includes a fund selection box 644, which provides the criteria for the funds in the listings 636 and which has, as options, SBI top equities in each investment strategy (as shown), current portfolio equities, "what if" selected equities, and a pre-existing or preselected list of equities. The set to target icon 648 causes the "what if" row 624 to be the same as the target row 628, and the set to current icon 652 causes the "what if" row 624 to return to the weightings and holdings of the current portfolio. As the weightings and/or equity holdings in each investment strategy column change, the "what if" row settings change in a corresponding manner. Lists of equities include quick watch funds (which are specified by the subscriber as equities whose performance is to be monitored) and other lists selected by subscriber. The subscriber can configure as many equity listings as he or she desires. The funds listed in the lower half of the display 600 are the funds in each strategy with the highest Diamond Rating. This rating captures the degree to which the fund manager is strategy consistent with ♦♦♦♦♦ (5 Diamond) being the best and ♦ (1 diamond) being the worst. Research shows that strategy consistent managers have outperformed those that lack strategy consistency. A fund's Diamond Rating is based on several objective measures of strategy consistency and does not contain any individual fund return performance measures. Thus, if past performance is important in selecting funds, the Diamond Ratings will have to be supplemented in the fund selection process. In each investment strategy column, a number of strategy control icons are presented to change the weightings in the "what if" row 624. The single down arrow 656 decreases the "what if" portfolio weighting in the corresponding column by 1% and the double down arrow 658 by 5%, the single up arrow 660 increases the weighting by 1%, and the double up arrow 662 by 5%. As a change is made in one column, the change is propagated to the weightings in the other (unlocked) columns and the position of the "what if" portfolio icon 664 changes, as appropriate. Adjusting the strategy control icons moves the "what if" or planned portfolio in a desired direction, typically closer to the target portfolio. Changing strategy allocations only affects the "what if" portfolio and not the current portfolio. Once the strategy allocation process is completed, specific fund allocations can be adjusted using the portfolio detail fly-out (FIG. 7).

The pad lock icon 668 shown between the pairs of arrows in each column permits the subscriber to prevent propagation of portfolio weightings. When the pad lock icon is shown as being an open or unlocked pad lock, this feature is not in effect, and changes are propagated freely as noted above. When the pad lock icon is shown as being closed or a locked pad lock, the percentage allocation or weighting in that column remains unchanged in response to changes in another column's allocation percentage. There must be at least two unlocked, positive allocation strategies for the allocation algorithm to operate properly.

The strategy frontier plot 672 shows the relative positions of the "what if" and current portfolios, the target portfolio 664, and the strategy frontier curve 640. The position of the current portfolio is fixed. The position of the target portfolio 610 and position and shape of the strategy frontier curve 640 can be changed by altering the return 612 and risk setting 614. The position of the "what if" portfolio 664 is changed by manipulation of the strategy control icons. Because no changes have been made to the current portfolio, the display 600 shows the positions of the "what if" and current portfolio as being identical. The positioning of the "what if" and current portfolios well below the strategy frontier curve 640 indicates that the portfolios are strategically not well diversified. A position closer to the curve 640 and more preferably closer to the target indicates that the portfolios are strategically well diversified. The downwardly facing arrows between the "what if" and target allocation rows 624 and 628 show that the percent by which the percentage allocations of the "what if" portfolio differ from the recommended target portfolio.

Figure 7:
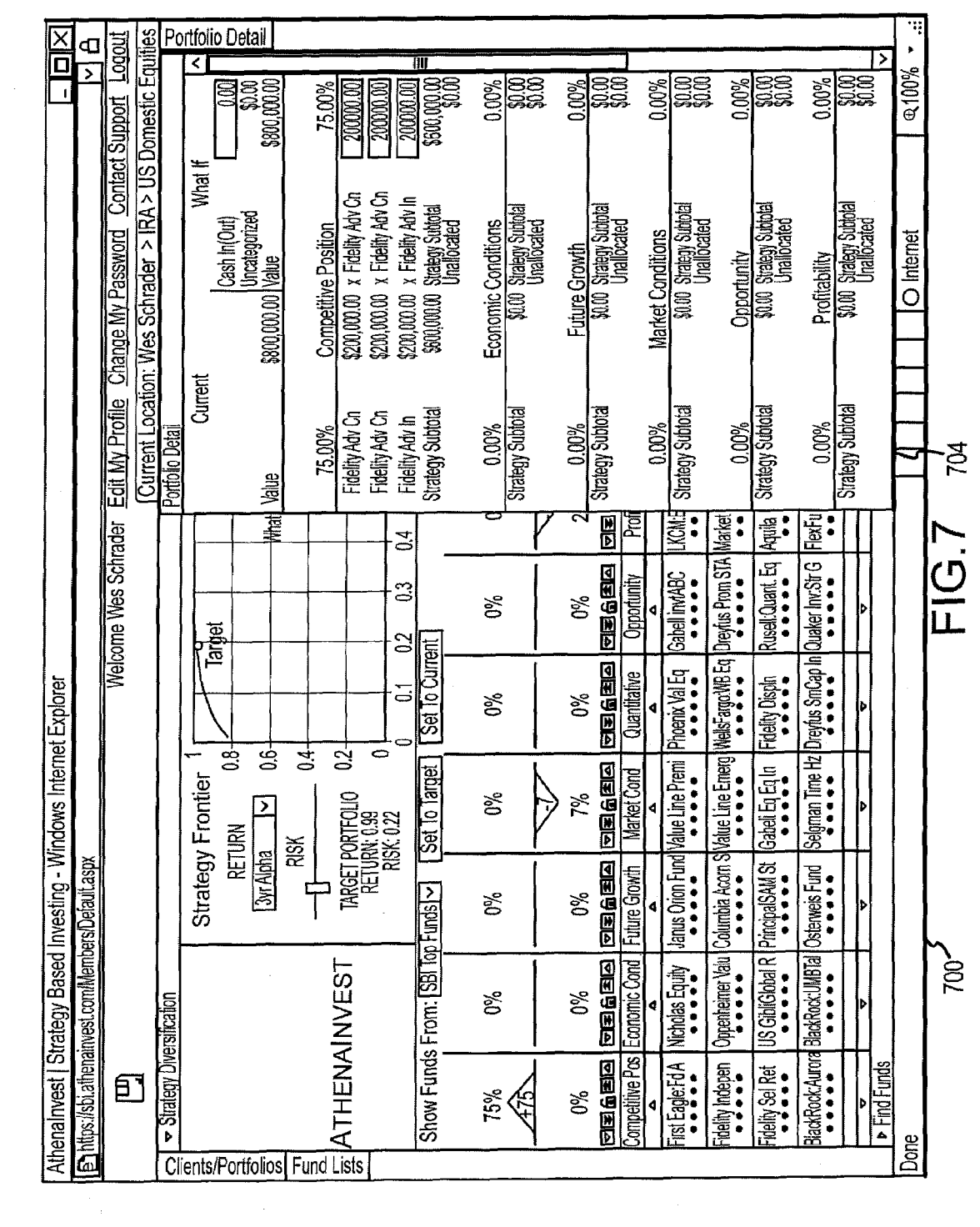

FIG. 7 depicts a screen shot 700 of the prior display when the cursor is moved to the portfolio detail tab 680 at the right margin of the display 600. A fly-out display 704 appears showing the security holdings of the current and "what if" portfolios, with the equities subdivided based on investment strategy category. A fund is eliminated by clicking on the x in front of the fund. The resulting cash inflow is added to the unallocated amount for that strategy. A fund is added from the funds listed at the bottom of the application by clicking on it and then clicking on "Add to Portfolio" at the bottom of the quick fund detail window. The fund is added with a zero money balance. At the top right of the fly-out, the subscriber then types in the cash in or out of the portfolio. If the subscriber were to click elsewhere in the fly-out, the "what if" total is updated. One-by-one, the subscriber increases or decreases the amount invested in each fund by typing in a new amount in the box to the right of each fund. If the subscriber were to click elsewhere in the fly-out, the totals are updated. This process is continued in this manner until the unallocated amounts are close to zero for each strategy as well as for the uncategorized funds.

Figure 8:
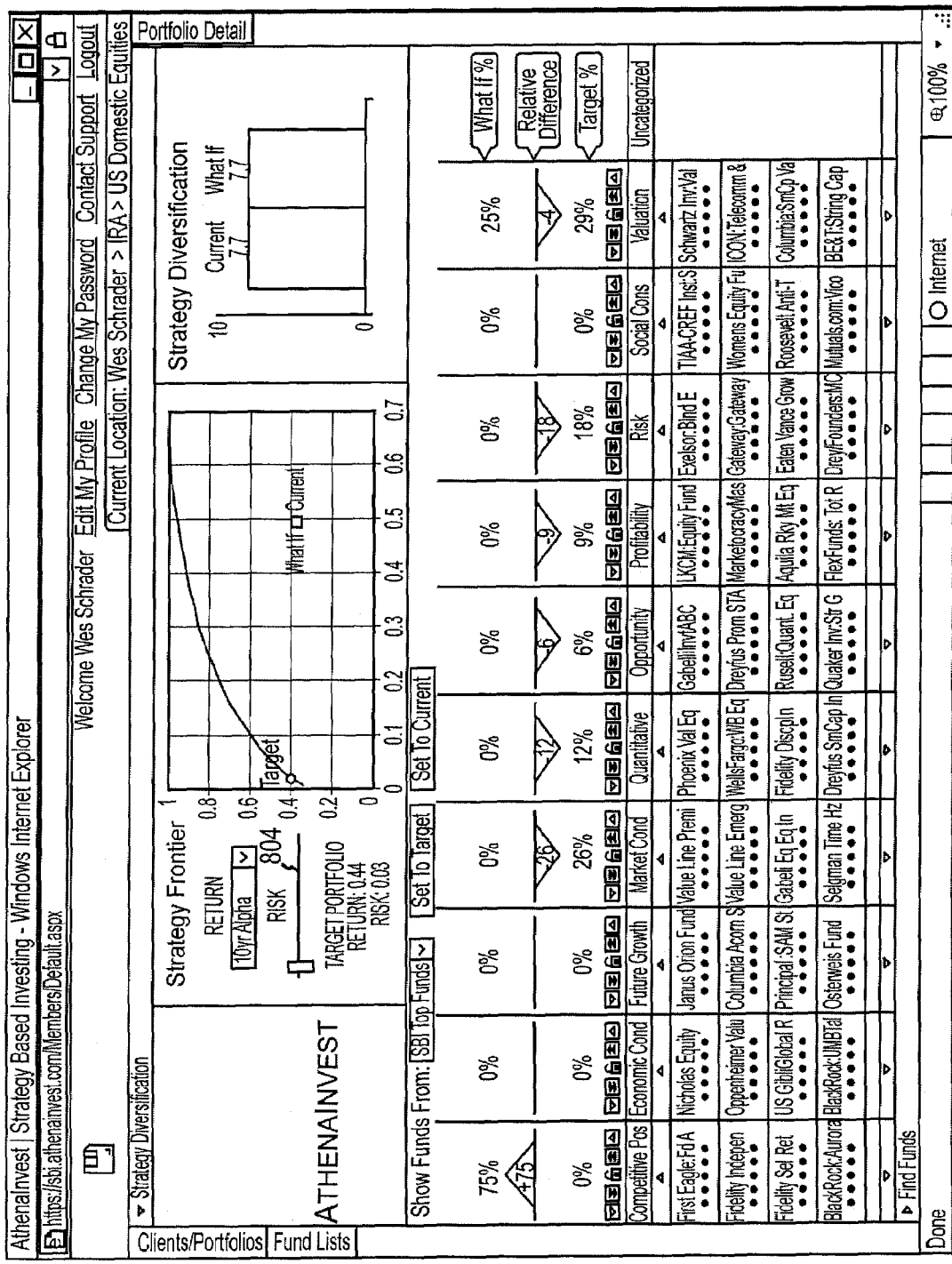
FIG. 8 is a screenshot according to an embodiment of the present invention.

FIG. 8 is a screen shot 800 differing from FIG. 6 in that the risk settings are different. FIG. 6 has a risk setting 614 equal to 0.54 while FIG. 8 has a risk setting 804 of 0.03. As can be seen by comparing the strategy frontiers of FIGS. 6 and 8, the positions and weightings of the target have changed.

Figure 9:
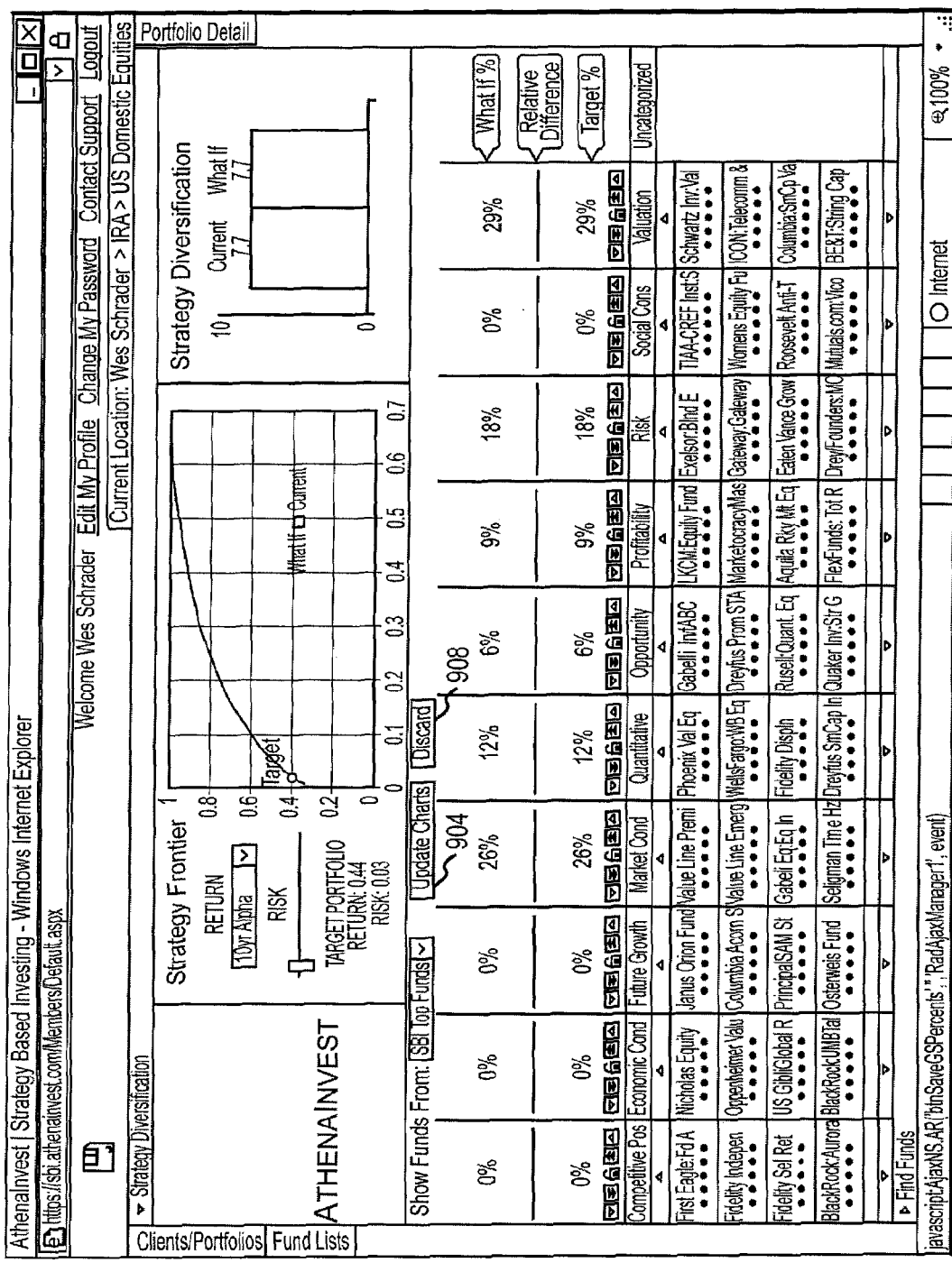
FIG. 9 is a screenshot according to an embodiment of the present invention.

FIG. 9 is a screen shot 900 differing from FIG. 6 in that changes have been made to the information shown in the lower half of the screen shot 900 and two new icons have appeared, the update chart icon 904 and discard icon 908. If selected, the former icon 904 updates the displayed strategy frontier to reflect the changes and the latter icon 908 does not update the displayed strategy frontier but rather discards all changes since the previous update.

Figure 10:
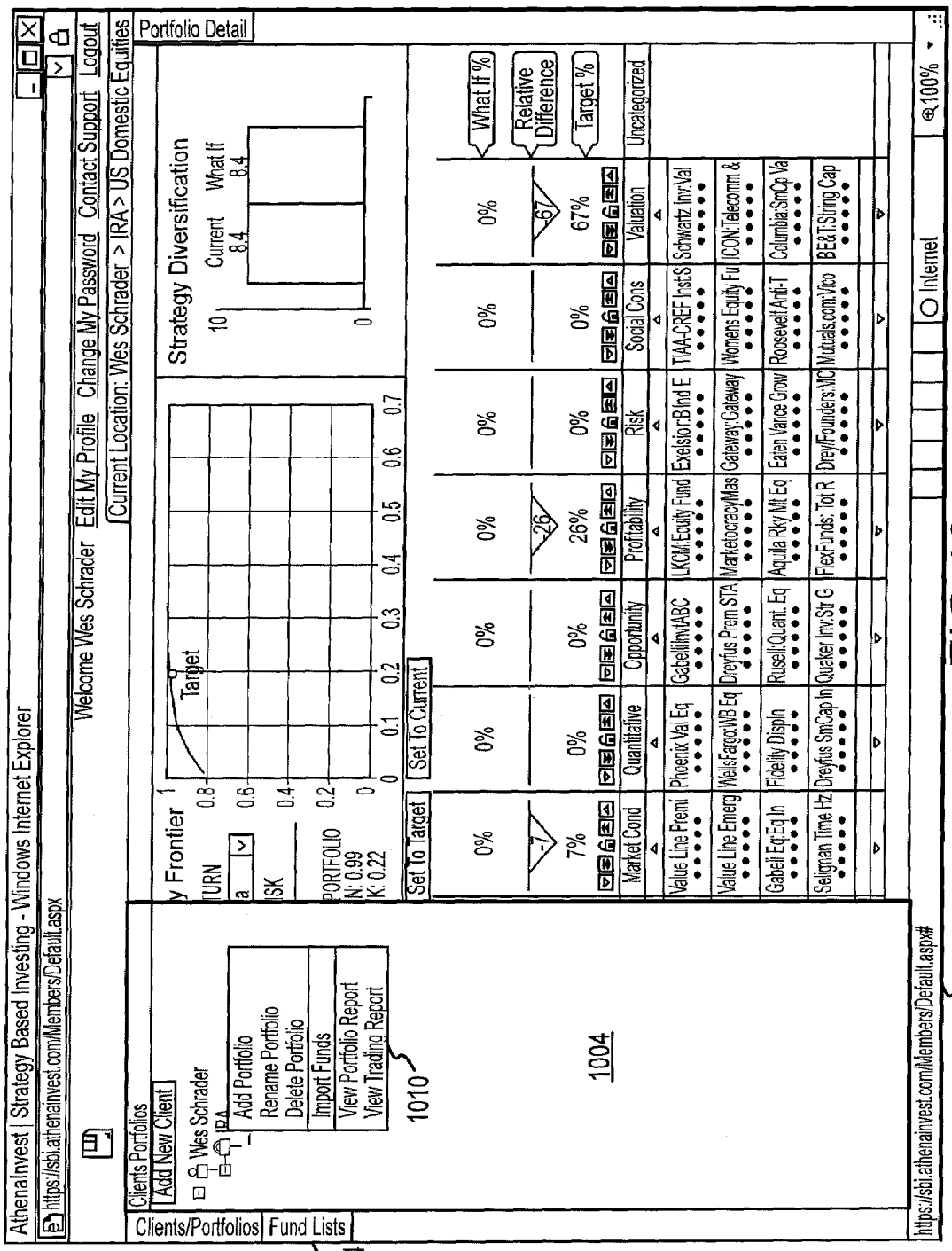
FIG. 10 is a screenshot according to an embodiment of the present invention.

FIG. 10 is a screen shot 1000 differing from FIG. 6 in that the cursor has been positioned over the clients/portfolios tab on the left side of the display 600. The drop down display 1004 appears, which lists the subscriber's clients and, for each client, a listing of portfolios or portfolio segments for that client. In the example of FIG. 10, the client is "Wes Schrader" and the portfolio segment for that client is "IRA". The relationship between the client and portfolio(s) is shown by a hierarchical tree structure. More than two levels of hierarchy are possible, such as, for instance, where a displayed portfolio has sub-portfolios or portfolio segments, and the displayed sub-portfolios include component stock holdings. The subscriber has further selected "IRA", which causes a further drop down display 1010 to appear. That display permits the subscriber to add a portfolio for the listed client, rename the selected portfolio of the client, delete the listed portfolio of the client, import funds, and the amount invested in each into the selected portfolio, view a portfolio report for the selected portfolio, and view a trading report for the selected client. As shown in FIG. 10, a new client file can be created by clicking on the "Add New Client" icon. When the icon is selected, a fly-out display is provided requesting the client and portfolio names. Additionally, the subscriber can import a list of funds, without amounts invested, as a fund list by moving the cursor over the "Fund List" tab 1014. The fund list function allows importing of the subscriber's preselected set of funds, whether preferred by the subscriber or the subscriber's firm, or funds of interest to the investor.

A portfolio report provides a summary of the portfolio in terms of strategies, allocations, consistency ratings, market cap and PE tilts, and risk. Combining this report with individual Fund Reports produces a comprehensive client report. The report includes all necessary disclosures which can be modified in order to meet the specific compliance requirements of your firm.

A sample trading report is shown in FIG. 12. This report should only be generated after the strategy diversification and fund allocation process is completed. It summarizes fund changes between the current and "what if" portfolios. The report includes the comparative weightings of the current and "what if" portfolios and provides the difference or change between the portfolio weightings.

Figure 11:
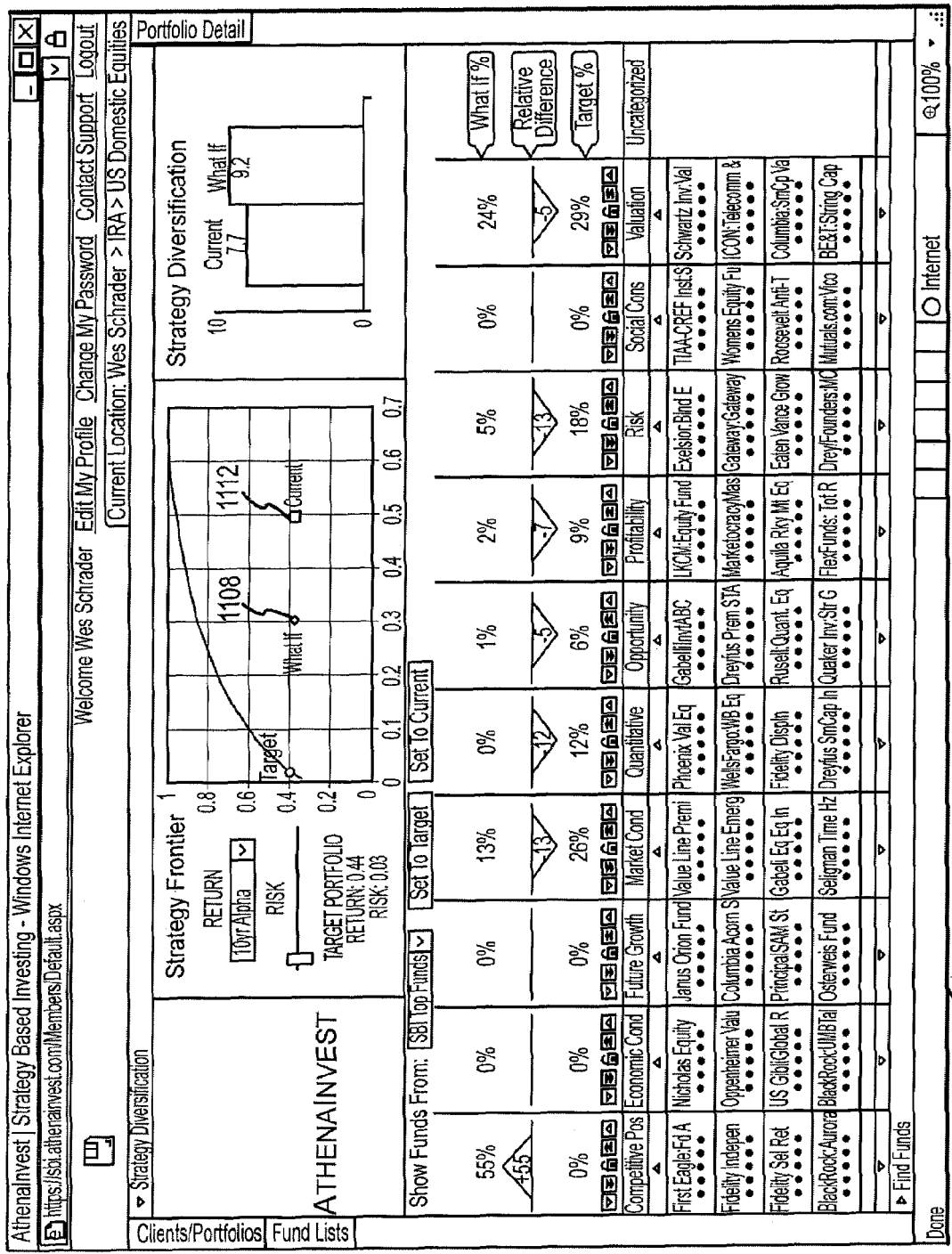
FIG. 11 is a screenshot according to an embodiment of the present invention.

FIG. 11 is a screen shot 1100 that differs from the display 600 of FIG. 6 in that changes have been made to the "what if" row 1104 and the "update charts" icon 904 selected. The strategy frontier graph has been refreshed to show a "what if" portfolio icon 1108 reflecting the changes and a current portfolio icon 1112 reflecting the weightings of the current portfolio. The position of the target icon remains unchanged as no changes have been made to the return and risk profile.

Figure 14:
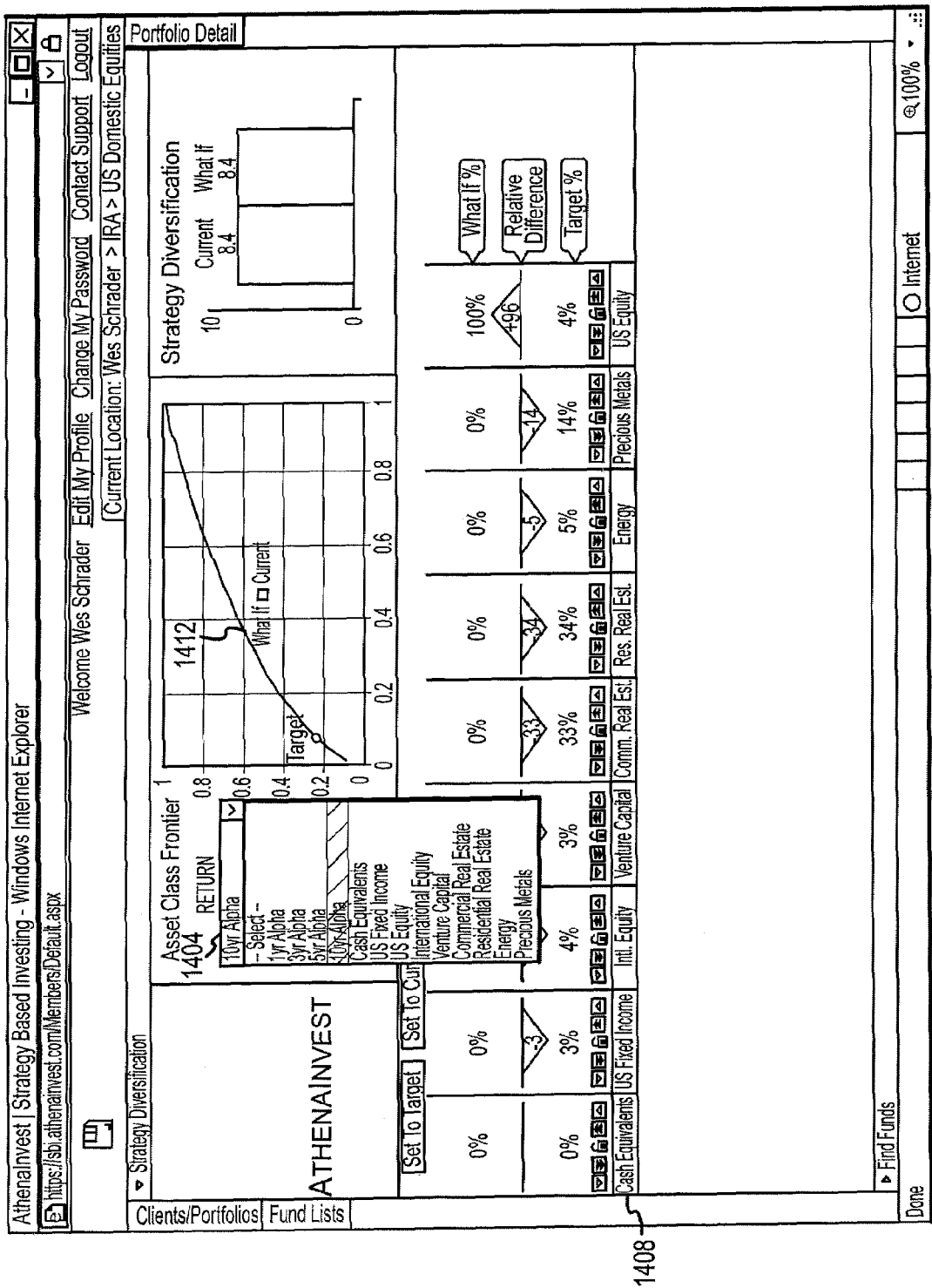
FIG. 14 is a screenshot according to an embodiment of the present invention.

FIG. 14 is a screenshot 1400 depicting the option of setting asset class allocation profile. The drop down menu 1404 associated with return has changed from the set of selections shown in FIG. 13 to the following set of selections: 1-year alpha, 3-year alpha, 5-year alpha, 10-year alpha, cash equivalents, US fixed income, US equity, international equity, venture capital, commercial real estate, residential real estate, energy, and precious metals. Additionally, the strategy frontier label has changed to asset class frontier, and the column associations have changed to mirror the listed asset categories 1408, namely cash equivalents, US fixed income, US equity, international equity, venture capital, commercial real estate, residential real estate, energy, and precious metals. Each asset class is associated with a corresponding relative return of which the target profile and asset class frontier curve 1412 are functions. Screenshot 1400 appears when the subscriber selects a client's (multi-asset class) portfolio generally while screenshot 600 appears when the subscriber selects a US equity sub-portfolio or portfolio segment of the subscriber. The asset class totals are entered into a portfolio detail fly-out (FIG. 7) in the box to the right of each current asset class. The "what if" allocations can then be changed as desired. The allocation totals are used for input into the sub portfolio allocation process. In this manner, the subscriber is able to work in multiple asset types or only one asset type.

The operation of the SBI system 300 will now be described with reference to FIGS. 15-19.

Figure 15:
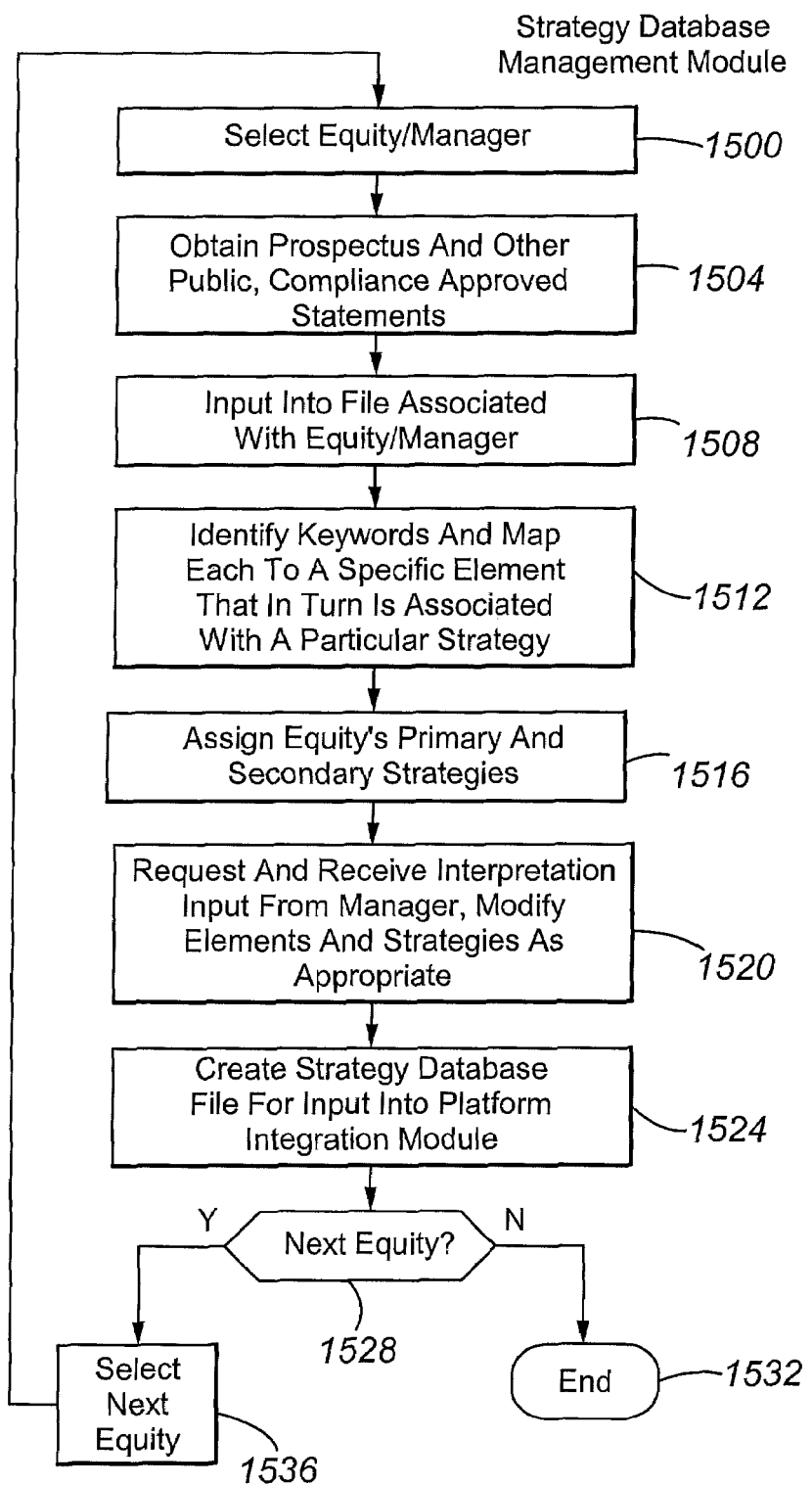
FIG. 15 is a flowchart according to an embodiment of the present invention.

Referring to FIG. 15, the strategy database management module 376 in box 1500 selects a security and/or manager.

In box 1504, the module 376 obtains the prospectus and other public compliance approved statements, such as from one or more of the first, second, . . . nth databases 316*a-n*. The statements are parsed and keywords located.

In box 1508, the located information is inputted into a temporary file or record associated with the selected security and/or manager.

In box 1512 which may be performed as part of box 1508, the identified keywords are mapped, each to a specific strategy element that, in turn, is associated with a particular investment strategy.

In box 1516, the module 376 assigns the selected security's/manager's primary and secondary investment strategies and populates appropriate fields in the data record.

In box 1520, the module 376 requests and receives interpretation input from the selected manager, modifies the strategy elements, and investment strategies, as appropriate. Preferably, the manager-selected primary and secondary investment strategies and strategy elements take precedence over conflicting information in the record. Boxes 1516 and 1520 may be performed in the reverse order.

In box 1524, the module 376 creates a file or record in the strategy database 348 for input into the platform integration module 384.

In decision diamond 1528, the module 376 determines whether there is a next security/manager to be processed. If not, the module 376 terminates operation in oval 1532. If so, the module 376 selects the next security/manager in step 1536 and returns to and repeats box 1500.

Figure 16:
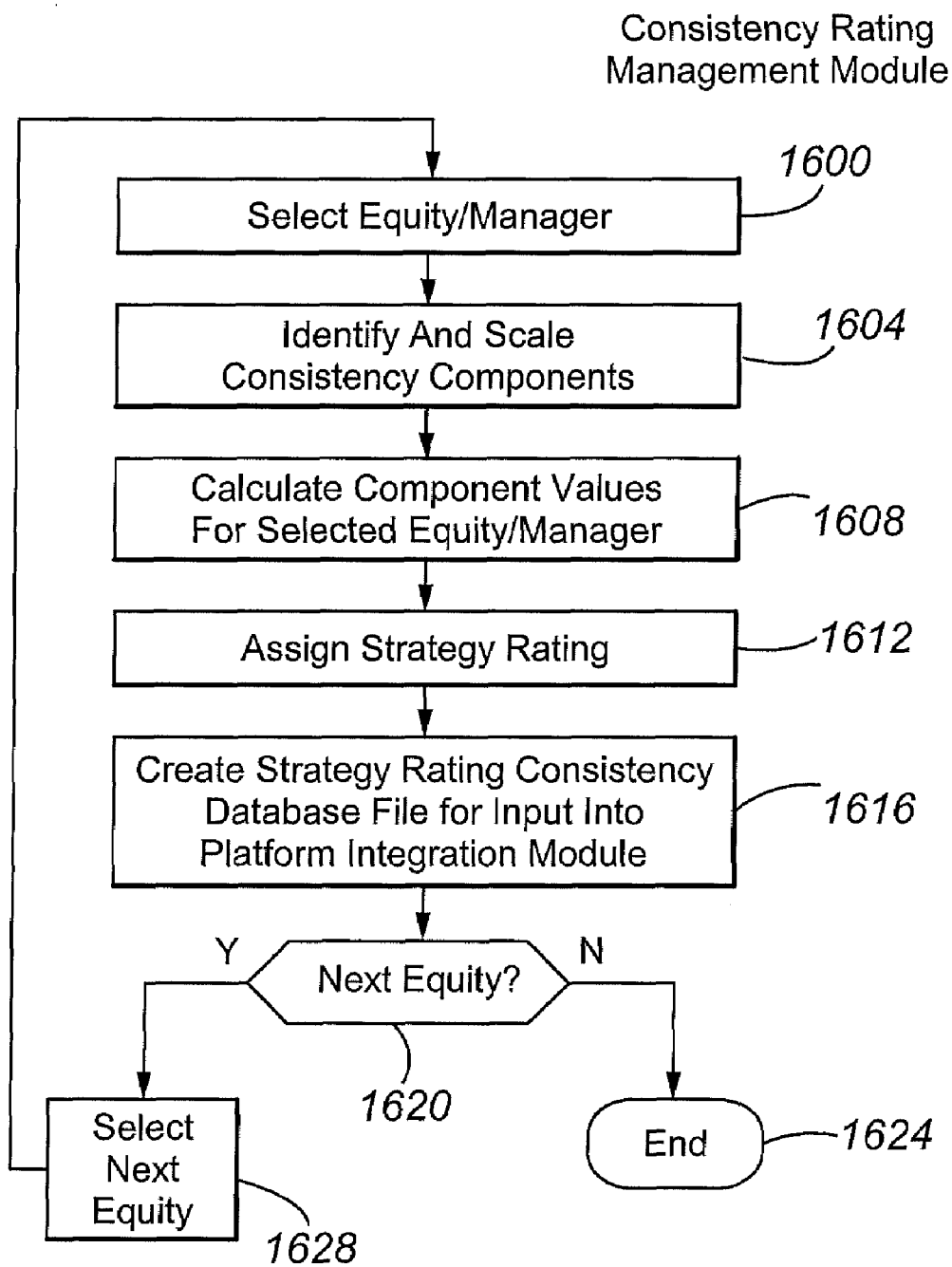
FIG. 16 is a flowchart according to an embodiment of the present invention.

Referring now to FIG. 16, the strategy consistency module 380 selects an security/manager in box 1600.

In box 1604, the module 380 identifies and scales consistency components and, in box 1608, calculates component values for the selected security/manager. As noted, the consistency components include (a) a correlation of selected security returns with strategy investment index returns, (b) a correlation of selected security returns with characteristic indices, (c) a computation of quantitative portfolio characteristics identified as being associated with the particular investment strategy; and (d) information received from the selected manager(s).

In box 1612, the module 380, based on the components, assigns a strategy category.

In box 1616, the module 380 creates a strategy rating consistency database file for input into the platform integration module 384.

In decision diamond 1620, the module 380 determines if there is a next security/manager. If not, the module terminates in oval 1624. If so, the module, in box 1528, selects the next security/manager and returns to and repeats box 1600.

Figure 17:
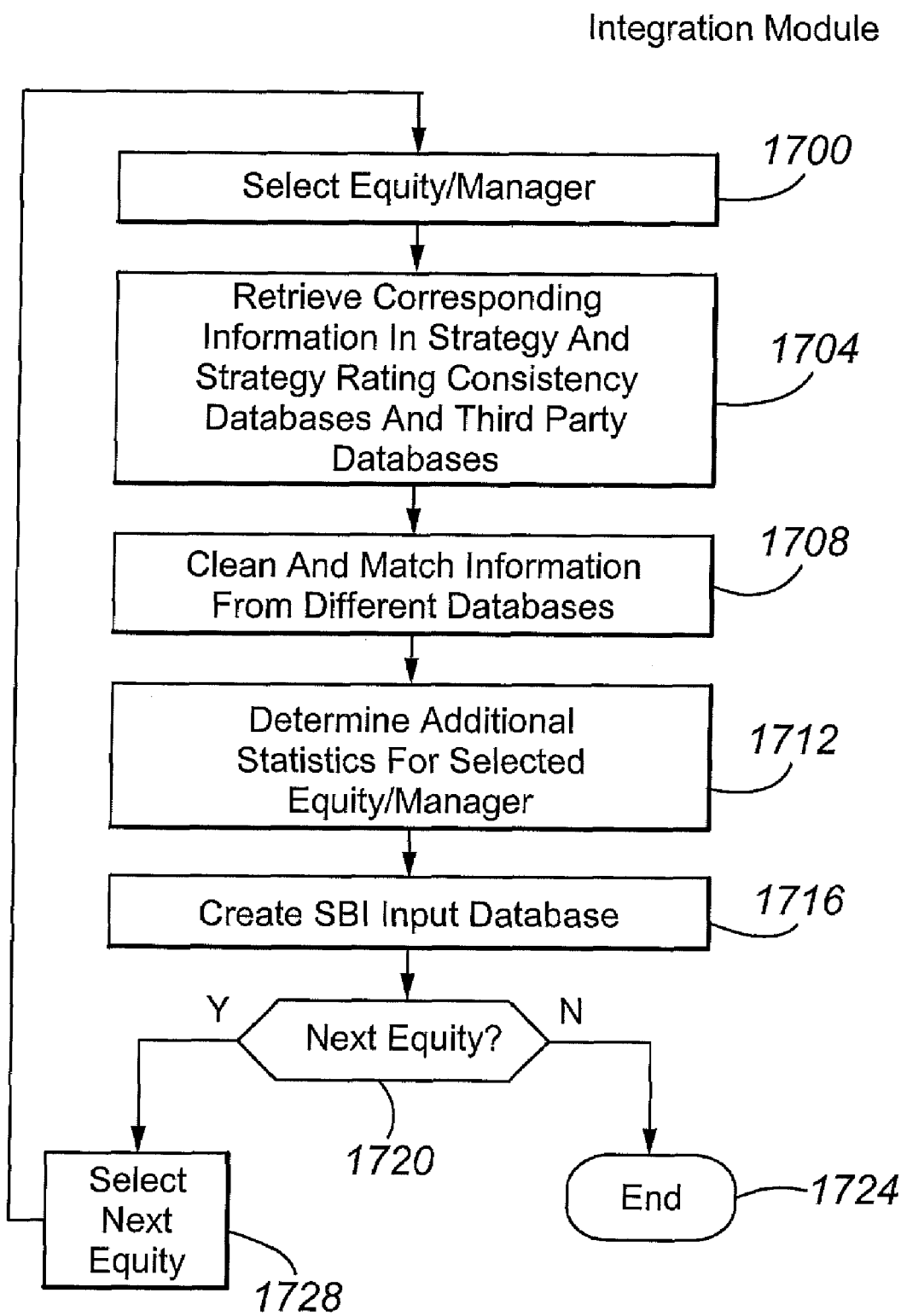
FIG. 17 is a flowchart according to an embodiment of the present invention.

Referring to FIG. 17, the operation of the platform integration module 384 will now be discussed.

In box 1700, the module 384 selects a security/manager.

In box 1704, the module 384 retrieves, for the selected security/manager, corresponding records in the strategy and strategy rating consistency databases 348 and 352 and the first, second, . . . nth databases 316*a-n*.

In box 1708, the module 384 cleans and matches information in the retrieved records. As will be appreciated, the data records can have differing formats, syntax, grammars, and/or be expressed in differing languages. The module 384 converts the data records into a common form of expression.

In box 1712, the module 384 determines, from the information, additional statistics for the selected security/manager.

In box 1716, the module 384 creates a record in the SBI input database 356.

In box 1720, the module 384 determines whether there is a next security/manager to be processed. If not, the module 384 terminates operation in oval 1724. If so, the module 384 selects the next security/manager in box 1728 and returns to and repeats box 1700.

Figure 18:
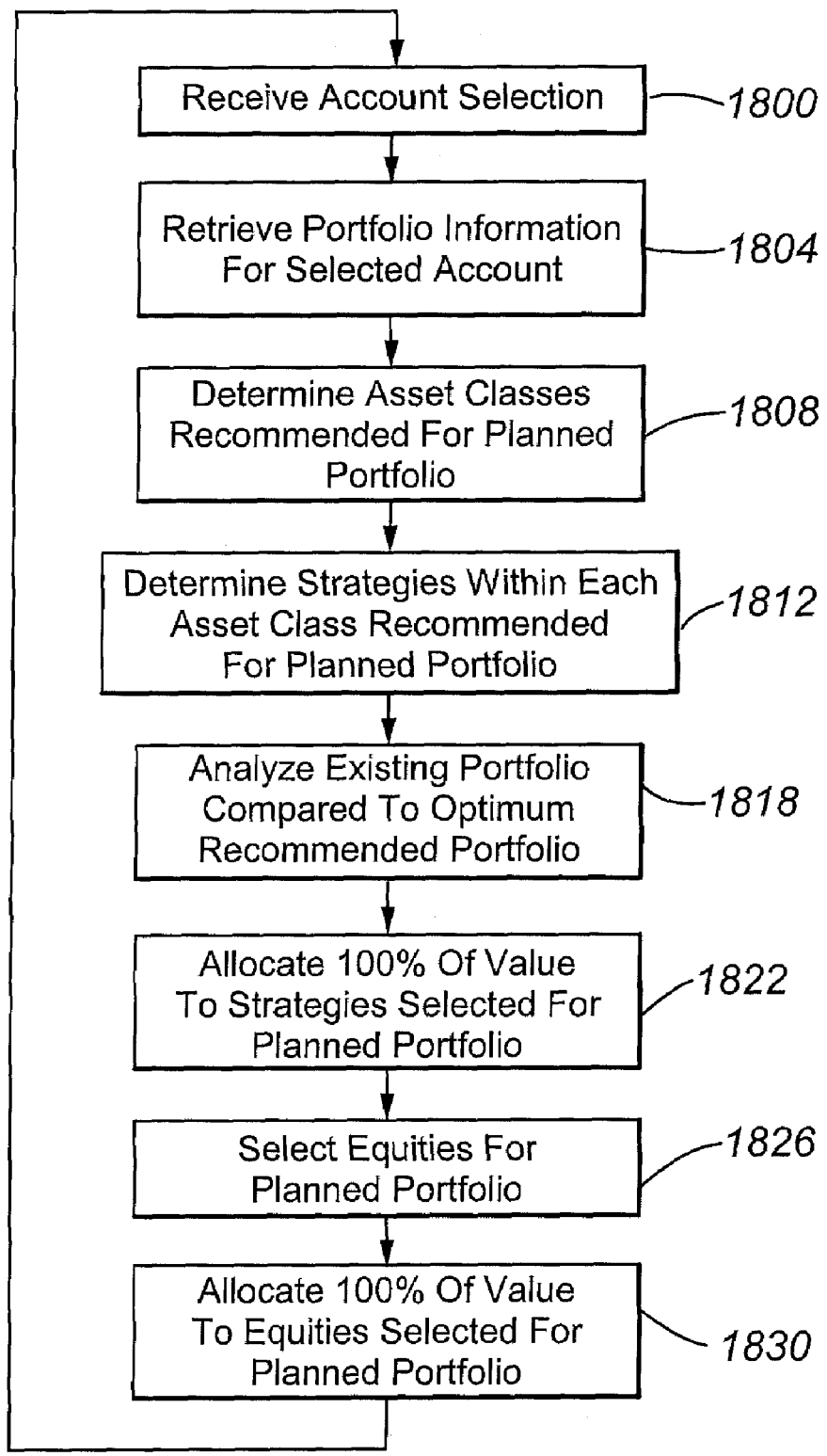
FIG. 18 is a flowchart according to an embodiment of the present invention.

The overall operation of the SBI system 300 will now be discussed with reference to FIG. 18.

In box 1800, the SBI system 300 receives, from a subscriber, an account selection. The account can be the actual number or a sub-component of the account, such as information associated with a current portfolio or portion thereof. This operation may be performed by accessing an existing account, creating a new account, or importing an account into the SBI system 300. User interfaces useful in this operation include FIG. 10. The output of this operation includes the current portfolio information.

In box 1804, the SBI system 300 retrieves portfolio information for the selected account.

In box 1808, the system 300 determines an asset class or type recommended for the portfolio. The subscriber provides an asset class alpha (or relative return) and an anchor asset class (e.g., cash equivalents, US fixed income, US equity, international equity, venture capital, commercial real estate, residential real estate, energy, and precious metals), and a beta or risk value from the risk setting icon. User interfaces supported in this operation include FIGS. 2, 4, 5, 8, 9, 11, 13, and 14. Outputs of this operation include recommended asset classes and asset class allocations percentages or weightings.

In box 1812, the SBI system 300 determines the investment strategies within each asset class recommended for the portfolio. Inputs for this operation include the investment strategy alpha (or relative return), anchor investment strategy, and beta value. Features supporting this operation include limiting security selection by a preconfigured security list, limiting security selection by selected subscriber security searches, and preselected screening or filtering criteria. Outputs of this operation include recommended investment strategies and allocation percentages.

In box 1818, the SBI system 300 analyzes the portfolio information compared to the optimum, recommended, or target portfolio. Inputs for this operation include recommended investment strategies and allocation percentages and the (current) portfolio information. Outputs of this operation include portfolio attribution, portfolio hypothetical performance, and portfolio comparison.

In box 1822, the system 300 allocates one hundred percent of the account value to strategies selected for the planned portfolio. Inputs for this operation include recommended investment strategies and allocation percentages. Outputs for this operation include selected strategies, allocation percentages, and portfolio attribution.

In box 1826, the system 300 selects securities for the planned portfolio. Inputs for this operation include subscriber selected strategies and allocation percentages. User interfaces for this operation include security/manager screening, quick results, and security/manager details. The "quick results" option permits the list of funds to be limited by a saved user list ("limit by list" sub-option), a selected named screen ("limit by named screen" sub-option), and top five securities per investment strategy with no filtering ("view" sub-option). Outputs for this operation include a selected security/manager.

In box 1830, the system 300 allocates one hundred percent of the account value to securities selected for the planned portfolio. Input for this operation includes selected securities managers. The output of this operation is the planned portfolio security/holdings and weightings. Report outputs of this operation include investment roadmap report, portfolio hypothetical performance, and portfolio comparison.

Figure 19:
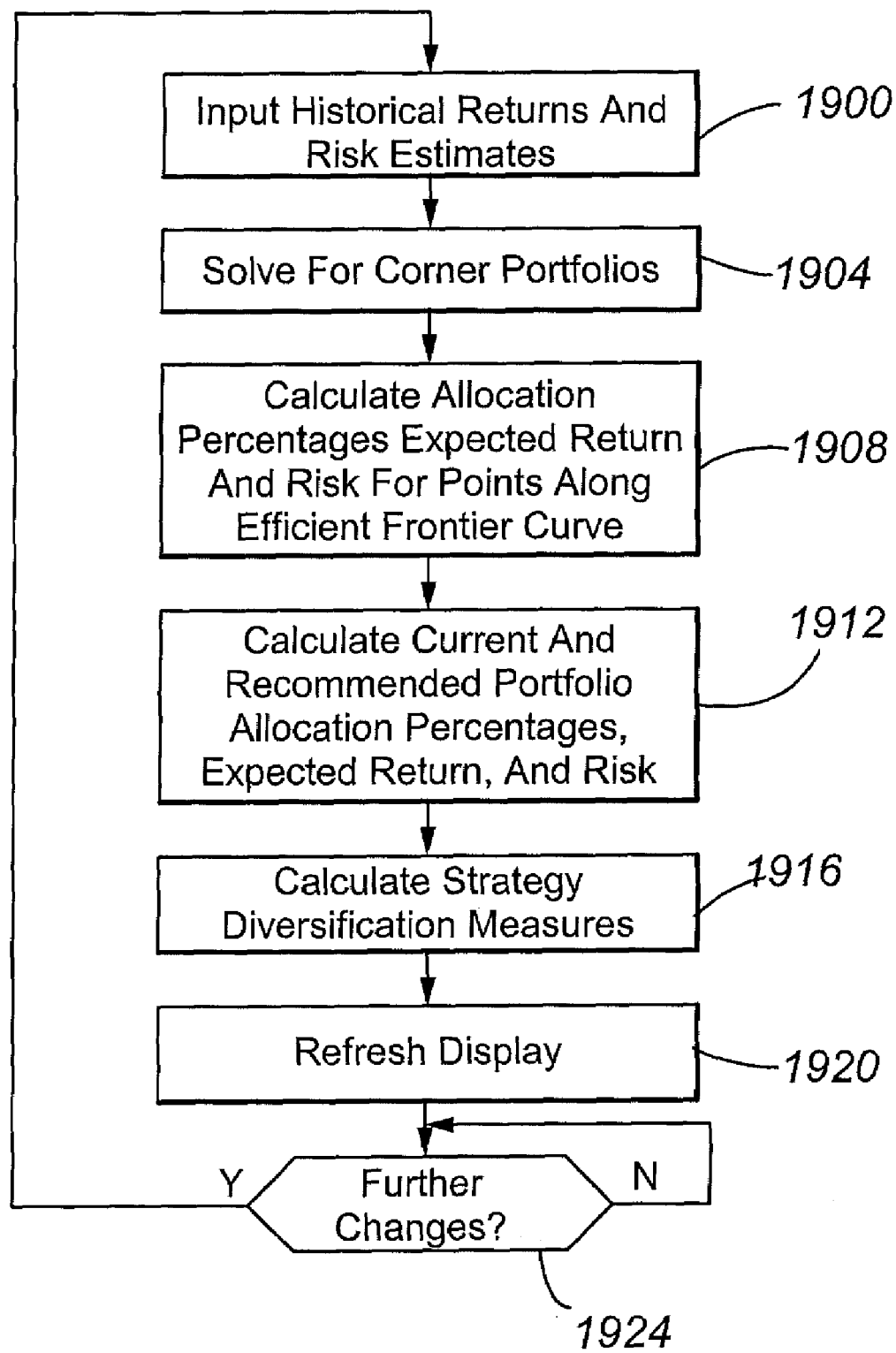
FIG. 19 is a flowchart according to an embodiment of the present invention.

FIG. 19 depicts the algorithm used to configure the strategy frontier section 608, strategy diversification section 604, allocation percentages, by investment strategy, in the "what if" and target rows 624 and 628 of display 600 (FIG. 6).

In box 1900, for the inputted relative return and risk setting historical returns and risk estimates are obtained by the SBI system 300.

In box 1904, the system 300 solves for the corner portfolios using a suitable algorithm, such as the Elton & Grubber single index algorithm. As will be appreciated, the corner portfolios refer to those efficient frontier portfolios in which a new strategy enters and a current strategy exits.

In box 1908, the system 300 calculates the allocation percentages for each investment strategy, the expected return, and risk for points along the strategy frontier curve.

In box 1912, the system 300 calculates the allocation percentages for each investment strategy, the expected return, and risk for the current and "what if" or planned portfolios.

In box 1916, the system 300 calculates the strategy diversification measures to be displayed in the strategy diversification section 604.

In box 1920, the system 300 refreshes the display in accordance with the determined parameters. As noted, when changes have been to the "what if" portfolio the subscriber needs to select update charts for the changes to be displayed on the frontier section 608. Changes to the relative return or risk settings cause the frontier section automatically to be refreshed.

In decision diamond 1924, the system 300 determines whether further changes have been received from the subscriber. If not, the system, at a periodic interval, repeats decision diamond 1924. If so, the system 300 returns to and repeats box 1900.

Using the primary and secondary investment strategies and SBI peer groups, a variety of differing types of analysis and comparisons may be effected.

In a first example, investment strategy indices are created; that is, within each investment strategy an index, using a suitable weighting basis such as price or market value, is created. The resulting indices will be based on the funds/managers pursuing the specified strategy and can be created using fund returns as a whole or individual fund holdings returns. Multiple indices for each strategy will be created based on different levels of strategy consistency. By way of illustration, a competitive position index, a future growth index, and the like are created for an SBI peer group. The investment strategy index, in one technique, is done by combining the returns of the managers pursuing the selected investment strategy, or the members of the SBI peer group corresponding to the selected investment strategy, to yield a weighted index. The returns may be for the managed assets or, when the managed assets are funds, for the individual holdings in each fund.

In a second example, a market "shelf space" module will be created that allows asset managers to analyze the current market wide fund offerings, as shown in the example of FIG. 20. The shelf space is organized by primary (vertical axis) and secondary (horizontal axis) strategies and can be sorted and displayed using many different fund measures, such as return profile 612, risk measure, and money flows. In the example of FIG. 20, the investment strategies are sorted from highest to lowest by three year risk adjusted returns and the display is the number of funds in each primary and secondary strategy combination.

In a third example, a return attribution module is created. This can allow for attribution of a fund's return performance based on the primary and secondary investment strategies being pursued, as well as the specific elements the manager does and does not focus on. This is different from the current approach of attributing returns to the characteristics (e.g. market cap, PE, sector, industry, etc) of the assets being held by the manager. An example of investment strategy return attribution is shown in FIG. 21. The fund return, 14.25%, is analyzed to determine the various contributors to the return. The universe return, 10.25%, is the average or weighted return for the SBI peer group for the primary investment strategy. The valuation index alpha is 1.23%. Subtracting the universe return and valuation index alpha from the fund's return yields the fund alpha of 2.77%. The contribution from each element associated with the selected fund is then determined. The element 1 return is 0.35% and element 2 return 0.76%. Subtracting these returns from the fund alpha yields an unexplained alpha of 1.13%. Unlike characteristic box approaches, this type of return attribution permits a selected fund's returns to be tracked relative to the other fund's in the SBI peer group.

In a fourth example, a strategy tracker is created. This measure is commonly based on the holdings of a selected fund as compared to the average holdings of the other funds pursuing the primary or secondary investment strategy associated with the selected fund. This will provide an objective time-series measure of how consistently a manager is pursuing the fund's primary strategy. Investors and others will use this measure to detect strategy drift and the impact of hiring a new fund manager on strategy, among other things. As will be appreciated, the strategy tracker can provide the consistency measure, which is an indication of how closely the selected fund or manager thereof follows the migration of the associated alpha cluster. It has been observed, as a general rule, that the more closely an investor follows a return alpha cluster, the better the investor's performance.

In a fifth example, assets are categorized by the investment strategies of the managers that manage them.

The exemplary systems and methods of this invention are described in relation to financial analysis and planning systems. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a common platform, or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, differing sets of investment strategies are used for differing types of assets or securities. As will be appreciated, the particular set or suite of investment strategies employed by a manager depends on the type of asset or security. An investment strategy used for mutual funds frequently differs, for instance, from that employed for a hedge fund. To accommodate this variation in investment strategies, the invention can use an asset or security-type identifier to indicate the particular set or suite of investment strategies applicable in any given application or otherwise to be presented to a user. This identifier can further be used to categorize assets or securities in the data structures and in assigning assets and securities to peer groups.

In another alternative embodiment, the systems and methods of this invention are implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory.

Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) selecting, by a computer processor-executable strategy database management module, a first manager, the first manager managing a first managed security;
   (b) obtaining, by the computer processor-executable strategy database management module, information describing the selected manager, wherein the information is prepared by or on behalf of the first managed security and/or manager;
   (c) mapping, by the computer processor-executable strategy database management module and by keyword searching the information, three or more of the following elements: strength of fundamentals, defensibility of market position, management quality, strength of innovation, gross domestic product, interest rate, monetary policy, rate of company growth, rate of earnings growth, sustainable growth rate, accelerated growth rate, technical analysis, charting, momentum, earnings surprise, price modeling, strength of margins, strength of financials, return on equity, return on invested capital, stochastic modeling, quantitative method, statistical modeling, business risk, controlling risk, market risk, social responsibility, political issues, and religious issues;
   (d) determining, by the computer processor-executable strategy database management module and from an identified set of elements, different first and second investment strategies pursued by the first manager for the first managed security, wherein each of the first and second investment strategies is one of competitive position strategy, economic conditions investment strategy, future growth investment strategy, market condition investment strategy, opportunity investment strategy, profitability investment strategy, quantitative investment strategy, risk investment strategy, social considerations investment strategy, and value investment strategy; and
   (e) categorizing, by the computer processor-executable strategy database management module, the first manager as pursuing the determined first and second investment strategies.

2. The method of claim 1, wherein the identified set of elements comprise a plurality of strength of fundamentals, defensibility of market position, management quality, and strength of innovation and wherein the investment strategy pursued by the first manager is competitive position strategy and further comprising:
   (f) providing at least one of the first and second investment strategies to the first manager for interpretation input; and
   (g) in response to receipt of interpretation input from the first manager, recategorizing, by the computer processor-executable strategy database management module, the first manager as pursuing a third investment strategy different from the first and second investment strategies.

3. The method of claim 1, wherein the identified set of elements comprise a plurality of gross domestic product, interest rates, and monetary policy and wherein the investment strategy pursued by the first manager is economic conditions investment strategy and further comprising:
   (f) providing at least one of the first and second investment strategies to the first manager for interpretation input; and
   (g) in response to receipt of interpretation input from the first manager, recategorizing, by the computer processor-executable strategy database management module, the first manager as pursuing a third investment strategy different from the first and second investment strategies.

4. The method of claim 1, wherein the identified set of elements comprise plurality of rate of overall company growth over a selected time period, rate of earnings growth over the selected time period, sustainable growth rate over the selected time period, and accelerated growth rate over the selected time period and wherein the investment strategy pursued by the first manager is future growth investment strategy and further comprising:
   (f) providing at least one of the first and second investment strategies to the first manager for interpretation input; and
   (g) in response to receipt of interpretation input from the first manager, recategorizing, by the computer processor-executable strategy database management module, the first manager as pursuing a third investment strategy different from the first and second investment strategies.

5. The method of claim 1, wherein the identified set of elements comprise plurality of technical analysis, charting, and momentum and wherein the investment strategy pursued by the first manager is market condition investment strategy and further comprising:
   (f) providing at least one of the first and second investment strategies to the first manager for interpretation input; and
   (g) in response to receipt of interpretation input from the first manager, recategorizing, by the computer processor-executable strategy database management module, the first manager as pursuing a third investment strategy different from the first and second investment strategies.

6. The method of claim 1, wherein the identified set of elements comprise at least one of earnings surprise and price modeling and wherein the investment strategy pursued by the first manager is opportunity investment strategy and further comprising:
   (f) providing at least one of the first and second investment strategies to the first manager for interpretation input; and
   (g) in response to receipt of interpretation input from the first manager, recategorizing, by the computer processor-executable strategy database management module, the first manager as pursuing a third investment strategy different from the first and second investment strategies.

7. The method of claim 1, wherein the identified set of elements comprise plurality of strength of margins, strength of financials, return on equity, and return on invested capital and wherein the investment strategy pursued by the first manager is profitability investment strategy and further comprising:
   (f) providing at least one of the first and second investment strategies to the first manager for interpretation input; and
   (g) in response to receipt of interpretation input from the first manager, recategorizing, by the computer processor-executable strategy database management module, the first manager as pursuing a third investment strategy different from the first and second investment strategies.

8. The method of claim 1, wherein the identified set of elements comprise plurality of rate of stochastic modeling, quantitative methods, and statistical modeling and wherein the investment strategy pursued by the first manager is quantitative investment strategy and further comprising:
   (f) providing at least one of the first and second investment strategies to the first manager for interpretation input; and
   (g) in response to receipt of interpretation input from the first manager, recategorizing, by the computer processor-executable strategy database management module, the first manager as pursuing a third investment strategy different from the first and second investment strategies.

9. The method of claim 1, wherein the identified set of elements comprise plurality of rate of business risk, controlling risk, and market risk and wherein the investment strategy pursued by the first manager is risk investment strategy and further comprising:
   (f) providing at least one of the first and second investment strategies to the first manager for interpretation input; and
   (g) in response to receipt of interpretation input from the first manager, recategorizing, by the computer processor-executable strategy database management module, the first manager as pursuing a third investment strategy different from the first and second investment strategies.

10. The method of claim 1, wherein the identified set of elements comprise plurality of social responsibility, political issues, and religious issues and wherein the investment strategy pursued by the first manager is social considerations investment strategy and further comprising:
    (f) providing at least one of the first and second investment strategies to the first manager for interpretation input; and
    (g) in response to receipt of interpretation input from the first manager, recategorizing, by the computer processor-executable strategy database management module, the first manager as pursuing a third investment strategy different from the first and second investment strategies.

11. The method of claim 1, wherein the identified set of elements comprise plurality of price ratios, contrarian, and cash flow valuation and wherein the investment strategy pursued by the first manager is valuation investment strategy and further comprising:
    (f) providing at least one of the first and second investment strategies to the first manager for interpretation input; and
    (g) in response to receipt of interpretation input from the first manager, recategorizing, by the computer processor-executable strategy database management module, the first manager as pursuing a third investment strategy different from the first and second investment strategies.

12. The method of claim 1, further comprising:
    (f) receiving, from a user, a selected return and risk;
    (g) based on the selected return and risk, determining, by the processor, automatically a risk-return efficient frontier;
    (h) based on the selected level of risk, determining, by the processor, a tangency portfolio, the tangency portfolio having allocation weightings among members of a set of asset classes and/or set of investment strategies;
    (i) determining, by the processor, differences between the tangency portfolio and a user selected portfolio; and
    (j) providing, by the processor, the differences to the user.

13. The method of claim 12, wherein steps (g) and (h) comprise the substeps:
    (i) using the selected level of risk, determining, by the processor, corner asset portfolios;
    (ii) determining, by the processor, allocation weightings among members of the set of asset classes and/or set of investment strategies, expected return, and risk for selected points along the efficient frontier; and
    (iii) determining, for the tangency portfolio and by the processor, allocation weightings among members of the set of asset classes and/or set of investment strategies, expected return, and risk.

14. The method of claim 13, further comprising:
    (iv) determining a diversification measure for the selected asset portfolio; and
    (v) providing the diversification measure to the user.

15. The method of claim 1, further comprising:
    (f) providing, by the processor, to a user a plurality of investment strategies, each investment strategy comprising a set of managed securities; and
    (g) for each security in the sets of managed securities, providing, by the processor, the user with a consistency measure indicating a degree to which the respective manager adheres to the corresponding investment strategy.

16. The method of claim 12, wherein steps (g) and (h) comprise the substeps:

(i) using, by the processor, the selected level of risk, determining corner asset portfolios;

(ii) determining, by the processor, allocation weightings among members of the set of asset classes and/or set of investment strategies, expected return, and risk for selected points along the efficient frontier;

(iii) determining, for the tangency portfolio and by the processor, allocation weightings among members of the set of asset classes and/or set of investment strategies, expected return, and risk;

(iv) determining, by the processor, a diversification measure for the selected portfolio; and (v) providing, by the processor, the diversification measure to the user.

17. The method of claim 12, wherein in step (h) the set of investment strategies is used and further comprising:

(k) determining, for at least one investment strategy and by the processor, at least one dissimilar investment strategy; and (l) providing, by the processor, the at least one dissimilar investment strategy to the user.

18. The method of claim 1, further comprising:

(f) selecting, by the processor, for each investment strategy a set of managers and/or securities, each manager and/or security having a corresponding consistency measure, the consistency measure indicating a degree of consistency of the security and/or manager thereof in adhering to the associated investment strategy;

(g) receiving from the user a change in asset allocation weightings for at least one investment strategy in the selected portfolio to form an altered selected portfolio;

(h) determining, by the processor, differences between the tangency portfolio and the altered selected portfolio; and (i) providing, by the processor, the differences of step (h) to the user.

19. The method of claim 18, wherein step (h) comprises the substeps:

(H1) recomputing, by the processor, the asset allocation weightings of the members of the set of investment strategies to reflect the change; and (H2) providing, for each investment strategy and by the processor, numerical indicators of the differences between the tangency portfolio and the altered selected portfolio.

20. A method, comprising:

(a) selecting, by a computer processor-executable strategy database management module, a first managed security and/or manager;

(b) receiving, by the computer processor-executable strategy database management module, information describing the selected managed security and/or manager, wherein the information is prepared by or on behalf of the first managed security and/or manager;

(c) establishing a correspondence between the information describing the selected managed security and/or manager, by the computer processor-executable strategy database management module and in the information, three or more of the following elements: strength of fundamentals, defensibility of market position, management quality, strength of innovation, gross domestic product, interest rate, monetary policy, rate of company growth, rate of earnings growth, sustainable growth rate, accelerated growth rate, technical analysis, charting, momentum, earnings surprise, price modeling, strength of margins, strength of financials, return on equity, return on invested capital, stochastic modeling, quantitative method, statistical modeling, business risk, controlling risk, market risk, social responsibility, political issues, and religious issues;

(d) determining, by the computer processor-executable strategy database management module and from an identified set of elements, an investment strategy pursued by the first managed security and/or manager, wherein the investment strategy is one of competitive position strategy, economic conditions investment strategy, future growth investment strategy, market condition investment strategy, opportunity investment strategy, profitability investment strategy, quantitative investment strategy, risk investment strategy, social considerations investment strategy, and value investment strategy; and (e) categorizing, by the computer processor-executable strategy database management module, the first managed security and/or manager as pursuing the determined investment strategy; and, (f) providing at least one of the first and second investment strategies to the first managed security and/or manager for interpretation input.

21. The method of claim 20, wherein the identified set of elements comprise a plurality of strength of fundamentals, defensibility of market position, management quality, and strength of innovation and wherein the investment strategy pursued by the first managed security and/or manager is competitive position strategy and wherein, in step (e), the computer processor-executable strategy database management module categorizes the first managed security and/or manager as following a first investment strategy as a primary investment strategy and a different second investment strategy as a secondary investment strategy.

22. The method of claim 20, wherein the identified set of elements comprise a plurality of gross domestic product, interest rates, and monetary policy and wherein the investment strategy pursued by the first managed security and/or manager is economic conditions investment strategy and wherein, in step (e), the computer processor-executable strategy database management module categorizes the first managed security and/or manager as following a first investment strategy as a primary investment strategy and a different second investment strategy as a secondary investment strategy.

23. The method of claim 20, wherein the identified set of elements comprise plurality of rate of overall company growth over a selected time period, rate of earnings growth over the selected time period, sustainable growth rate over the selected time period, and accelerated growth rate over the selected time period and wherein the investment strategy pursued by the first managed security and/or manager is future growth investment strategy and wherein, in step (e), the computer processor-executable strategy database management module categorizes the first managed security and/or manager as following a first investment strategy as a primary investment strategy and a different second investment strategy as a secondary investment strategy.

24. The method of claim 20, wherein the identified set of elements comprise plurality of technical analysis, charting, and momentum and wherein the investment strategy pursued by the first managed security and/or manager is market condition investment strategy and wherein, in step (e), the computer processor-executable strategy database management module categorizes the first managed security and/or manager as following a first investment strategy as a primary investment strategy and a different second investment strategy as a secondary investment strategy.

25. The method of claim 20, wherein the identified set of elements comprise at least one of earnings surprise and price modeling and wherein the investment strategy pursued by the first managed security and/or manager is opportunity investment strategy and wherein, in step (e), the computer processor-executable strategy database management module categorizes the first managed security and/or manager as following a first investment strategy as a primary investment strategy and a different second investment strategy as a secondary investment strategy.

26. The method of claim 20, wherein the identified set of elements comprise plurality of strength of margins, strength of financials, return on equity, and return on invested capital and wherein the investment strategy pursued by the first managed security and/or manager is profitability investment strategy and wherein, in step (e), the computer processor-executable strategy database management module categorizes the first managed security and/or manager as following a first investment strategy as a primary investment strategy and a different second investment strategy as a secondary investment strategy.

27. The method of claim 20, wherein the identified set of elements comprise plurality of rate of stochastic modeling, quantitative methods, and statistical modeling and wherein the investment strategy pursued by the first managed security and/or manager is quantitative investment strategy and wherein, in step (e), the computer processor-executable strategy database management module categorizes the first managed security and/or manager as following a first investment strategy as a primary investment strategy and a different second investment strategy as a secondary investment strategy.

28. The method of claim 20, wherein the identified set of elements comprise plurality of rate of business risk, controlling risk, and market risk and wherein the investment strategy pursued by the first managed security and/or manager is risk investment strategy and wherein, in step (e), the computer processor-executable strategy database management module categorizes the first managed security and/or manager as following a first investment strategy as a primary investment strategy and a different second investment strategy as a secondary investment strategy.

29. The method of claim 20, wherein the identified set of elements comprise plurality of social responsibility, political issues, and religious issues and wherein the investment strategy pursued by the first managed security and/or manager is social considerations investment strategy and wherein, in step (e), the computer processor-executable strategy database management module categorizes the first managed security and/or manager as following a first investment strategy as a primary investment strategy and a different second investment strategy as a secondary investment strategy.

30. The method of claim 20, wherein the identified set of elements comprise plurality of price ratios, contrarian, and cash flow valuation and wherein the investment strategy pursued by the first managed security and/or manager is valuation investment strategy and wherein, in step (e), the computer processor-executable strategy database management module categorizes the first managed security and/or manager as following a first investment strategy as a primary investment strategy and a different second investment strategy as a secondary investment strategy.

31. The method of claim 20, further comprising:
(f) receiving, from a user, a selected return and risk;
(g) based on the selected return and risk, determining, by the processor, automatically a risk-return efficient frontier;
(h) based on the selected level of risk, determining, by the processor, a tangency portfolio, the tangency portfolio having allocation weightings among members of a set of asset classes and/or set of investment strategies;
(i) determining, by the processor, differences between the tangency portfolio and a user selected portfolio; and
(j) providing, by the processor, the differences to the user.

32. The method of claim 31, wherein steps (g) and (h) comprise the substeps:
(i) using the selected level of risk, determining, by the processor, corner asset portfolios;
(ii) determining, by the processor, allocation weightings among members of the set of asset classes and/or set of investment strategies, expected return, and risk for selected points along the efficient frontier;
(iii) determining, for the tangency portfolio and by the processor, allocation weightings among members of the set of asset classes and/or set of investment strategies, expected return, and risk;
(iv) determining a diversification measure for the selected asset portfolio; and
(v) providing the diversification measure to the user.

33. The method of claim 20, further comprising:
(f) providing, by the processor, to a user a plurality of investment strategies, each investment strategy comprising a set of managed securities; and
(g) for each security in the sets of managed securities, providing, by the processor, the user with a consistency measure indicating a degree to which the respective manager adheres to the corresponding investment strategy.

34. The method of claim 31, wherein steps (g) and (h) comprise the substeps:
(i) using, by the processor, the selected level of risk, determining corner asset portfolios;
(ii) determining, by the processor, allocation weightings among members of the set of asset classes and/or set of investment strategies, expected return, and risk for selected points along the efficient frontier;
(iii) determining, for the tangency portfolio and by the processor, allocation weightings among members of the set of asset classes and/or set of investment strategies, expected return, and risk;
(iv) determining, by the processor, a diversification measure for the selected portfolio; and
(v) providing, by the processor, the diversification measure to the user.

35. The method of claim 31, wherein in step (h) the set of investment strategies is used and further comprising:
(k) selecting, by the processor, for each investment strategy a set of securities, each security having a corresponding consistency measure, the consistency measure indicating a degree of consistency of the security and/or a manager thereof in adhering to the associated investment strategy.

36. The method of claim 31, wherein in step (h) the set of investment strategies is used and further comprising:
(k) determining, for at least investment strategy and by the processor, at least one dissimilar investment strategy; and
(l) providing, by the processor, the at least one dissimilar investment strategy to the user.

37. The method of claim 20, further comprising:
(f) selecting, by the processor, for each investment strategy a set of managers and/or securities, each manager and/or security having a corresponding consistency measure, the consistency measure indicating a degree of consistency of the security and/or manager thereof in adhering to the associated investment strategy;

(g) receiving from the user a change in asset allocation weightings for at least one investment strategy in the selected portfolio to form an altered selected portfolio;

(h) determining, by the processor, differences between the tangency portfolio and the altered selected portfolio; and (i) providing, by the processor, the differences of step (h) to the user.

38. The method of claim 20, wherein step (h) comprises the substeps:

(H1) recomputing, by the processor, the asset allocation weightings of the members of the set of investment strategies to reflect the change; and (H2) providing, for each investment strategy and by the processor, numerical indicators of the differences between the tangency portfolio and the altered selected portfolio.

39. A machine, comprising:

at least one computer processor operable to:

(a) select a first manager of a first managed security;

(b) receive information describing the selected first manager, wherein the information is prepared by or on behalf of the first managed security and/or manager;

(c) mapping the information to at least three of the following elements: strength of fundamentals, defensibility of market position, management quality, strength of innovation, gross domestic product, interest rate, monetary policy, rate of company growth, rate of earnings growth, sustainable growth rate, accelerated growth rate, technical analysis, charting, momentum, earnings surprise, price modeling, strength of margins, strength of financials, return on equity, return on invested capital, stochastic modeling, quantitative method, statistical modeling, business risk, controlling risk, market risk, social responsibility, political issues, and religious issues;

(d) determine, from an identified set of elements, different first and second investment strategies pursued by the first manager for the first managed security, wherein each of the first and second investment strategies is one of competitive position strategy, economic conditions investment strategy, future growth investment strategy, market condition investment strategy, opportunity investment strategy, profitability investment strategy, quantitative investment strategy, risk investment strategy, social considerations investment strategy, and value investment strategy; and (e) categorize the first manager as pursuing the determined first and second investment strategies.

40. The machine of claim 39, wherein the identified set of elements comprise a plurality of strength of fundamentals, defensibility of market position, management quality, and strength of innovation wherein the investment strategy pursued by the first managed security and/or manager is competitive position strategy, and wherein the computer processor is operable to perform the following operations:

(f) provide at least one of the first and second investment strategies to the first manager for interpretation input; and (g) in response to receipt of interpretation input from the first manager, recategorize, by the computer processor-executable strategy database management module, the first manager as pursuing a third investment strategy different from the first and second investment strategies.

41. The machine of claim 39, wherein the identified set of elements comprise a plurality of gross domestic product, interest rates, and monetary policy, wherein the investment strategy pursued by the first managed security and/or manager is economic conditions investment strategy, and wherein the computer processor is operable to perform the following operations:

(f) provide at least one of the first and second investment strategies to the first manager for interpretation input; and (g) in response to receipt of interpretation input from the first manager, recategorize, by the computer processor-executable strategy database management module, the first manager as pursuing a third investment strategy different from the first and second investment strategies.

42. The machine of claim 39, wherein the identified set of elements comprise plurality of rate of overall company growth over a selected time period, rate of earnings growth over the selected time period, sustainable growth rate over the selected time period, and accelerated growth rate over the selected time period, wherein the investment strategy pursued by the first managed security and/or manager is future growth investment strategy, and wherein the computer processor is operable to perform the following operations:

(f) provide at least one of the first and second investment strategies to the first manager for interpretation input; and (g) in response to receipt of interpretation input from the first manager, recategorize, by the computer processor-executable strategy database management module, the first manager as pursuing a third investment strategy different from the first and second investment strategies.

43. The machine of claim 39, wherein the identified set of elements comprise plurality of technical analysis, charting, and momentums, wherein the investment strategy pursued by the first managed security and/or manager is market condition investment strategy, and wherein the computer processor is operable to perform the following operations:

(f) provide at least one of the first and second investment strategies to the first manager for interpretation input; and (g) in response to receipt of interpretation input from the first manager, recategorize, by the computer processor-executable strategy database management module, the first manager as pursuing a third investment strategy different from the first and second investment strategies.

44. The machine of claim 39, wherein the identified set of elements comprise at least one of earnings surprise and price modeling, wherein the investment strategy pursued by the first managed security and/or manager is opportunity investment strategy, and wherein the computer processor is operable to perform the following operations:

(f) provide at least one of the first and second investment strategies to the first manager for interpretation input: and (g) in response to receipt of interpretation input from the first manager, recategorize, by the computer processor-executable strategy database management module, the first manager as pursuing a third investment strategy different from the first and second investment strategies.

45. The machine of claim 39, wherein the identified set of elements comprise plurality of strength of margins, strength of financials, return on equity, and return on invested capital, wherein the investment strategy pursued by the first managed security and/or manager is profitability investment strategy, and wherein the computer processor is operable to perform the following operations:

(f) provide at least one of the first and second investment strategies to the first manager for interpretation input; and (g) in response to receipt of interpretation input from the first manager, recategorize, by the computer processor-executable strategy database management module, the first manager as pursuing a third investment strategy different from the first and second investment strategies.

46. The machine of claim 39, wherein the identified set of elements comprise plurality of rate of stochastic modeling, quantitative methods, and statistical modeling, wherein the investment strategy pursued by the first managed security and/or manager is quantitative investment strategy, and wherein the computer processor is operable to perform the following operations:
 (f) provide at least one of the first and second investment strategies to the first manager for interpretation input; and
 (g) in response to receipt of interpretation input from the first manager, recategorize, by the computer processor-executable strategy database management module, the first manager as pursuing a third investment strategy different from the first and second investment strategies.

47. The machine of claim 39, wherein the identified set of elements comprise plurality of rate of business risk, controlling risk, and market risks, wherein the investment strategy pursued by the first managed security and/or manager is risk investment strategy, and wherein the computer processor is operable to perform the following operations:
 (f) provide at least one of the first and second investment strategies to the first manager for interpretation input; and
 (g) in response to receipt of interpretation input from the first manager, recategorize, by the computer processor-executable strategy database management module, the first manager as pursuing a third investment strategy different from the first and second investment strategies.

48. The machine of claim 39, wherein the identified set of elements comprise plurality of social responsibility, political issues, and religious issues, wherein the investment strategy pursued by the first managed security and/or manager is social considerations investment strategy, and wherein the computer processor is operable to perform the following operations:
 (f) provide at least one of the first and second investment strategies to the first manager for interpretation input; and
 (g) in response to receipt of interpretation input from the first manager, recategorize, by the computer processor-executable strategy database management module, the first manager as pursuing a third investment strategy different from the first and second investment strategies.

49. The machine of claim 39, wherein the identified set of elements comprise plurality of price ratios, contrarian, and cash flow valuation, wherein the investment strategy pursued by the first managed security and/or manager is valuation investment strategy, and wherein the computer processor is operable to perform the following operations:
 (f) provide at least one of the first and second investment strategies to the first manager for interpretation input; and
 (g) in response to receipt of interpretation input from the first manager, recategorize, by the computer processor-executable strategy database management module, the first manager as pursuing a third investment strategy different from the first and second investment strategies.

50. A computer program product comprising computer processor executable instructions, encoded onto a computer readable medium, which, when executed by the processor, cause the processor to perform the following operations:
 (a) select a first managed security and/or manager;
 (b) receive information describing the selected managed security and/or manager, wherein the information is prepared by or on behalf of the first managed security and/or manager;
 (c) establishing a correspondence between the information and three or more of the following elements: strength of fundamentals, defensibility of market position, management quality, strength of innovation, gross domestic product, interest rate, monetary policy, rate of company growth, rate of earnings growth, sustainable growth rate, accelerated growth rate, technical analysis, charting, momentum, earnings surprise, price modeling, strength of margins, strength of financials, return on equity, return on invested capital, stochastic modeling, quantitative method, statistical modeling, business risk, controlling risk, market risk, social responsibility, political issues, and religious issues;
 (d) determine, from an identified set of elements, an investment strategy pursued by the first managed security and/or manager, wherein the investment strategy is one of competitive position strategy, economic conditions investment strategy, future growth investment strategy, market condition investment strategy, opportunity investment strategy, profitability investment strategy, quantitative investment strategy, risk investment strategy, social considerations investment strategy, and value investment strategy;
 (e) categorize the first managed security and/or manager as pursuing the determined investment strategy;
 (f) provide at least one of the first and second investment strategies to the first managed security and/or manager for interpretation input; and
 (g) in response to receipt of interpretation input from the first manager, recategorize the first managed security and/or manager as pursuing a third investment strategy different from the first and second investment strategies.

51. The computer program product of claim 50, wherein the identified set of elements comprise a plurality of strength of fundamentals, defensibility of market position, management quality, and strength of innovation and wherein the investment strategy pursued by the first managed security and/or manager is competitive position strategy and wherein, in step (e), the computer processor-executable strategy database management module categorizes the first managed security and/or manager as following a first investment strategy as a primary investment strategy and a different second investment strategy as a secondary investment strategy.

52. The computer program product of claim 50, wherein the identified set of elements comprise a plurality of gross domestic product, interest rates, and monetary policy and wherein the investment strategy pursued by the first managed security and/or manager is economic conditions investment strategy and wherein, in step (e), the computer processor-executable strategy database management module categorizes the first managed security and/or manager as following a first investment strategy as a primary investment strategy and a different second investment strategy as a secondary investment strategy.

53. The computer program product of claim 50, wherein the identified set of elements comprise plurality of rate of overall company growth over a selected time period, rate of earnings growth over the selected time period, sustainable growth rate over the selected time period, and accelerated growth rate over the selected time period and wherein the investment strategy pursued by the first managed security and/or manager is future growth investment strategy and wherein, in step (e), the computer processor-executable strategy database management module categorizes the first managed security and/or manager as following a first investment strategy as a primary investment strategy and a different second investment strategy as a secondary investment strategy.

54. The computer program product of claim 50, wherein the identified set of elements comprise plurality of technical analysis, charting, and momentum and wherein the investment strategy pursued by the first managed security and/or manager is market condition investment strategy and wherein, in step (e), the computer processor-executable strategy database management module categorizes the first managed security and/or manager as following a first investment strategy as a primary investment strategy and a different second investment strategy as a secondary investment strategy.

55. The computer program product of claim 50, wherein the identified set of elements comprise at least one of earnings surprise and price modeling and wherein the investment strategy pursued by the first managed security and/or manager is opportunity investment strategy and wherein, in step (e), the computer processor-executable strategy database management module categorizes the first managed security and/or manager as following a first investment strategy as a primary investment strategy and a different second investment strategy as a secondary investment strategy.

56. The computer program product of claim 50, wherein the identified set of elements comprise plurality of strength of margins, strength of financials, return on equity, and return on invested capital and wherein the investment strategy pursued by the first managed security and/or manager is profitability investment strategy and wherein, in step (e), the computer processor-executable strategy database management module categorizes the first managed security and/or manager as following a first investment strategy as a primary investment strategy and a different second investment strategy as a secondary investment strategy.

57. The computer program product of claim 50, wherein the identified set of elements comprise plurality of rate of stochastic modeling, quantitative methods, and statistical modeling and wherein the investment strategy pursued by the first managed security and/or manager is quantitative investment strategy and wherein, in step (e), the computer processor-executable strategy database management module categorizes the first managed security and/or manager as following a first investment strategy as a primary investment strategy and a different second investment strategy as a secondary investment strategy.

58. The computer program product of claim 50, wherein the identified set of elements comprise plurality of rate of business risk, controlling risk, and market risk and wherein the investment strategy pursued by the first managed security and/or manager is risk investment strategy and wherein, in step (e), the computer processor-executable strategy database management module categorizes the first managed security and/or manager as following a first investment strategy as a primary investment strategy and a different second investment strategy as a secondary investment strategy.

59. The computer program product of claim 50, wherein the identified set of elements comprise plurality of social responsibility, political issues, and religious issues and wherein the investment strategy pursued by the first managed security and/or manager is social considerations investment strategy and wherein, in step (e), the computer processor-executable strategy database management module categorizes the first managed security and/or manager as following a first investment strategy as a primary investment strategy and a different second investment strategy as a secondary investment strategy.

60. The computer program product of claim 50, wherein the identified set of elements comprise plurality of price ratios, contrarian, and cash flow valuation and wherein the investment strategy pursued by the first managed security and/or manager is valuation investment strategy and wherein, in step (e), the computer processor-executable strategy database management module categorizes the first managed security and/or manager as following a first investment strategy as a primary investment strategy and a different second investment strategy as a secondary investment strategy.

61. The method of claim 12, wherein in step (h) the set of investment strategies is used and further comprising:
   (k) selecting, by the processor, for each investment strategy a set of securities, each security having a corresponding consistency measure, the consistency measure indicating a degree of consistency of the security and/or a manager thereof in adhering to the associated investment strategy.

62. The method of claim 20, further comprising:
   (g) in response to receipt of interpretation input from the first managed security and/or manager, recategorizing, by the computer processor-executable strategy database management module, the first managed security and/or manager as pursuing a third investment strategy different from the first and second investment strategies.

* * * * *